United States Patent [19]
Camras
[11] 3,869,712
[45] Mar. 4, 1975

[54] VIDEO PLAYBACK SYSTEM WITH FLUTTER TOLERANT CLAMPING

[75] Inventor: Marvin Camras, Glencoe, Ill.
[73] Assignee: IIT Research Institute, Chicago, Ill.

[22] Filed: June 18, 1973
[21] Appl. No.: 370,640

Related U.S. Application Data

[60] Continuation of Ser. No. 200,793, Nov. 22, 1971, abandoned. Division of Ser. No. 848,992, Aug. 11, 1969, abandoned, and Ser. No. 62,601, Aug. 10, 1970, Pat. No. 3,683,107, said Ser. No. 848,992, which is a division of Ser. No. 401,832, Oct. 6, 1964, Pat. No. 3,495,046, said Ser. No. 62,601, which is a continuation of Ser. No. 528,934, Feb. 21, 1966, abandoned, is a continuation-in-part of Ser. No. 393,382, Aug. 31, 1964, Pat. No. 3,506,780, continuation-in-part of Ser. No. 401,832, and Ser. No. 407,402, and Ser. No. 493,271.

[52] U.S. Cl. .......................... 360/33, 358/4, 358/9, 360/37
[51] Int. Cl. .......................... H04n 5/78
[58] Field of Search ......... 178/5.4 CD, 24, 69.5 TV; 360/33, 37; 358/8, 9, 4

[56] References Cited

UNITED STATES PATENTS

| | | | |
|---|---|---|---|
| 2,892,017 | 6/1959 | Houghton | 358/4 |
| 2,892,022 | 6/1954 | Houghton | 360/33 |
| 3,091,660 | 5/1963 | Houghton et al. | 360/37 |

OTHER PUBLICATIONS

Zenith NL 30/U, 3/64 Set 682, Folder 3 SAMS Foto Fact Folders.

*Primary Examiner*—Raymond F. Cardillo, Jr.
*Attorney, Agent, or Firm*—Hill, Gross, Simpson, Van Santen, Steadman, Chiara & Simpson

[57] ABSTRACT

A magnetic reproducing system for association with a color broadcast television receiver wherein a substantial degree of flutter in the tape drive is tolerated by the receiver circuitry and a special flutter tolerant clamping circuit is utilized for transmitting the reproduced video signal to the receiver.

3 Claims, 14 Drawing Figures

VIDEO PLAYBACK SYSTEM WITH FLUTTER TOLERANT CLAMPING

CROSS-REFERENCES TO RELATED APPLICATIONS

The present application is a continuation of my pending application Ser. No. 200,793 filed Nov. 22, 1971 (now abandoned) and a division of my earlier applications Ser. No. 848,992 filed Aug. 11, 1969 (now abandoned) and Ser. No. 62,601 filed Aug. 10, 1970 (now U.S. Pat. No. 3,683,107 issued Aug. 8, 1972).

My application Ser. No. 848,992 is a division of my application Ser. No. 401,832 filed Oct. 6, 1964 (now U.S. Pat. No. 3,495,046 issued Feb. 10, 1970) and also refers under 35 U.S.C. 120 to my application Ser. No. 393,282 filed Aug. 31, 1964 (now U.S. Pat. No. 3,506,780 issued Apr. 14, 1970).

My application Ser. No. 62,601 is a streamlined continuation of my application Ser. No. 528,934, filed Feb. 21, 1966 (now abandoned). Said application Ser. No. 528,934 is a continuation-in-part of U.S. Ser. No. 393,282 aforesaid, U.S. Ser. No. 401,832 aforesaid, U.S. Ser. No. 407,402 filed Oct. 29, 1964 (now U.S. Pat. No. 3,513,265 issued May 19, 1970), and U.S. Ser. No. 493,271 filed Oct. 5, 1965 (now U.S. Pat. No. 3,531,600 issued Sept. 29, 1970).

SUMMARY OF THE INVENTION

This invention relates to a wideband magnetic transducer system and particularly to a video playback system wherein a special flutter tolerant clamping circuit is utilized for transmitting the reproduced video signal to a television display device.

As stated in my application Ser. No. 344,075 filed Feb. 11, 1964, now U.S. Pat. No. 3,681,526 issued Aug. 1, 1972) an early embodiment is particularly concerned with a video recording and playback system wherein the record medium travels at relatively high speed and the video signal is recorded on a succession of narrow audio-video tracks extending lengthwise of the direction of travel of the record medium. Such embodiment is capable of providing an hour or more of recording on a 7 inch reel of ¼ inch wide magnetic record tape while avoiding the complexity and expense of a rotating type scanning head such as has previously been employed commercially.

In accordance with the present invention, a low cost magnetic tape transport system may be utilized which exhibits a substantial degree of flutter in the tape drive. My copending application Ser. No. 848,992 filed Aug. 11, 1969 (now abandoned) describes and claims a particularly economical stabilizing circuit which may adapt a conventional broadcast television receiver to respond to a reproduced video signal having a considerable degree of flutter. (This subject matter has been continued in a divisional application Ser. No. 199,977 filed Nov. 18, 1971 and now U.S. Pat. No. 3,824,619.) Conventional clamping circuits such as might be utilized with expensive studio type magnetic transducing apparatus would provide a higher degree of clamping than is desirable for such a low cost system. Accordingly, the present invention provides a special clamping circuit with a series resistance of substantial value for controlling the degree of clamping action. Preferably the series resistance provides a time constant with the coupling capacitance which transmits the reproduced video signal, of the order of the horizontal scan interval.

As described in my pending application Ser. No. 344,075 (now U.S. Pat. No. 3,681,526), the horizontal and vertical synchronizing pulses may be supplied to the video recording channel via a separate amplifier so as to have a relatively large amplitude in comparison to the picture signal portions per se upon reproduction.

As described in my application Ser. No. 848,992, (now abandoned) the features and objects of the invention include the following.

The tape reproducing system of the present invention is also concerned with providing improved electronic circuitry having a broad frequency response and capable of receiving intelligence signals from, and applying intelligence signals to a television receiver and which utilizes existing television receiver circuitry with a minimum of modification.

It is therefore an object of the present invention to provide a novel method and means for recording intelligence on a record medium and/or reproducing recorded intelligence.

Another object of the present invention is to provide a novel means by which effective high frequency bias in the megacycle range can be applied to a magnetic transducer head to improve the characteristics of video recording. This means can also be used with heads or other lower frequency recordings, particularly to allow a very high frequency bias which is advantageous in achieving lowest noise levels.

A further more specific object of the present invention is to provide a novel transducer system in which the intelligence applied thereto may be received directly from a commercially available television set, and in which the playback signal from the transducer system may be applied to the same or a different commercially available television set.

A still further more specific object of the present invention is to provide a transducer system of improved characteristics for recording intelligence with high frequency components of a magnitude such as is required for proper reproduction on commercial television receivers and the like.

As described in my application Ser. No. 62,601, (now U.S. Pat. No. 3,683,107) other objects include the following.

Still another object of the invention is to provide a system for recording and/or reproducing color television signals together with the related audio intelligence which is readily connected with present commercial broadcast receiver circuitry and which requires only three video transducer head units, or less.

Yet another object of the invention is to provide a system for recording and/or reproducing color television signals such as those which may be obtained from present commercial broadcast receivers, with the use of a low cost tape transport and stationary head units scanning the tape in the direction of tape movement.

Another and further object of the invention is to provide a system for recording and reproducing color television and audio signals with the use of broadcast receiver circuitry and a minimum number of additional low cost transistors of the order of 12.

Yet another and further object of the invention is to provide a color television record-playback system having great simplicity of operation with only a record-play switch and a tape transport selector being required (a color balance control being optional).

The objects of the aforementioned applications for patent are also applicable to the present disclosure and are specifically incorporated by reference at this point in the present specification.

Other objects, features and advantages of the present invention will be apparent from the following detailed description taken in connection with the accompanying drawings.

BRIEF DESCRIPTION OF THE ACCOMPANYING DRAWINGS

Figure 4A:
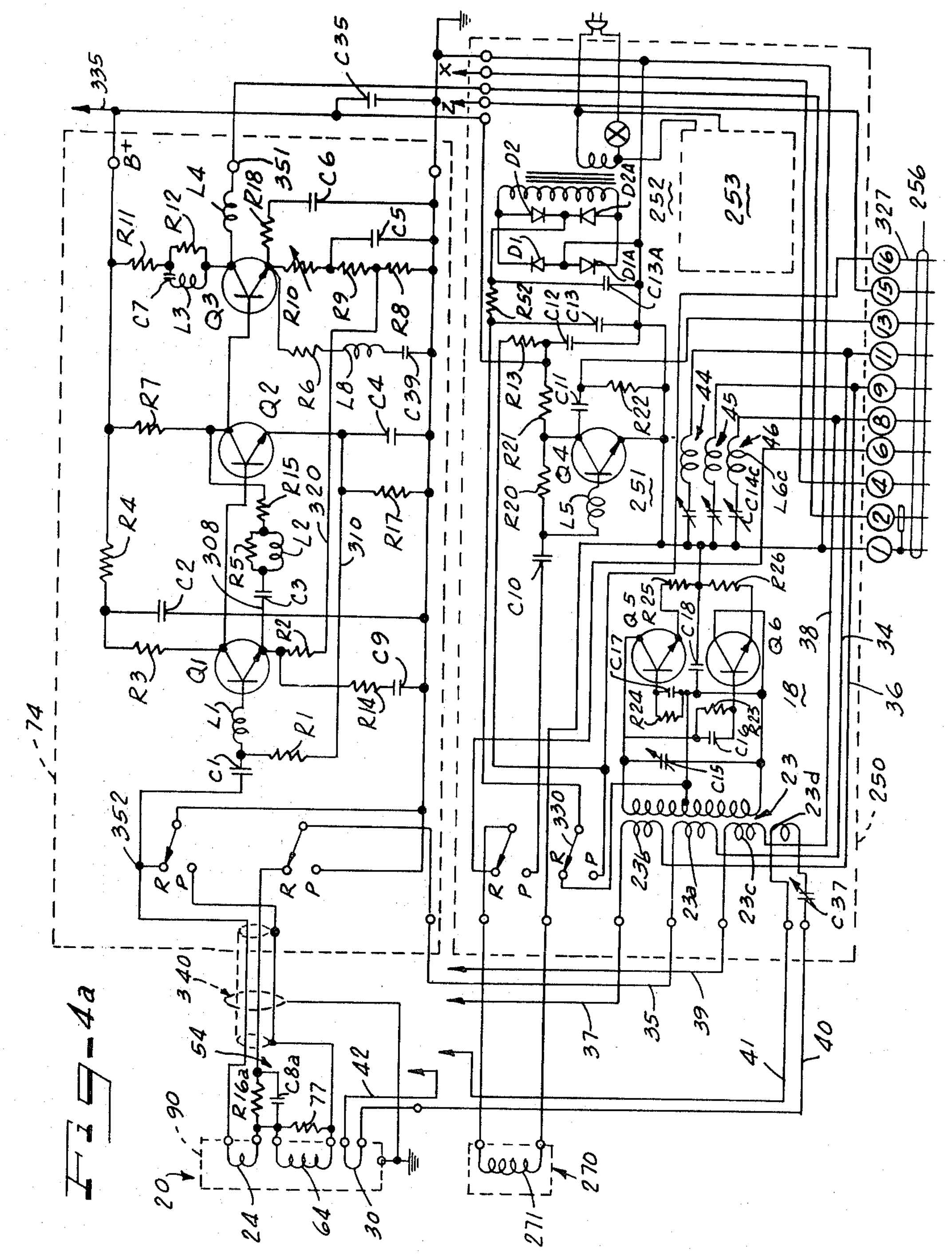
Figure 4B:
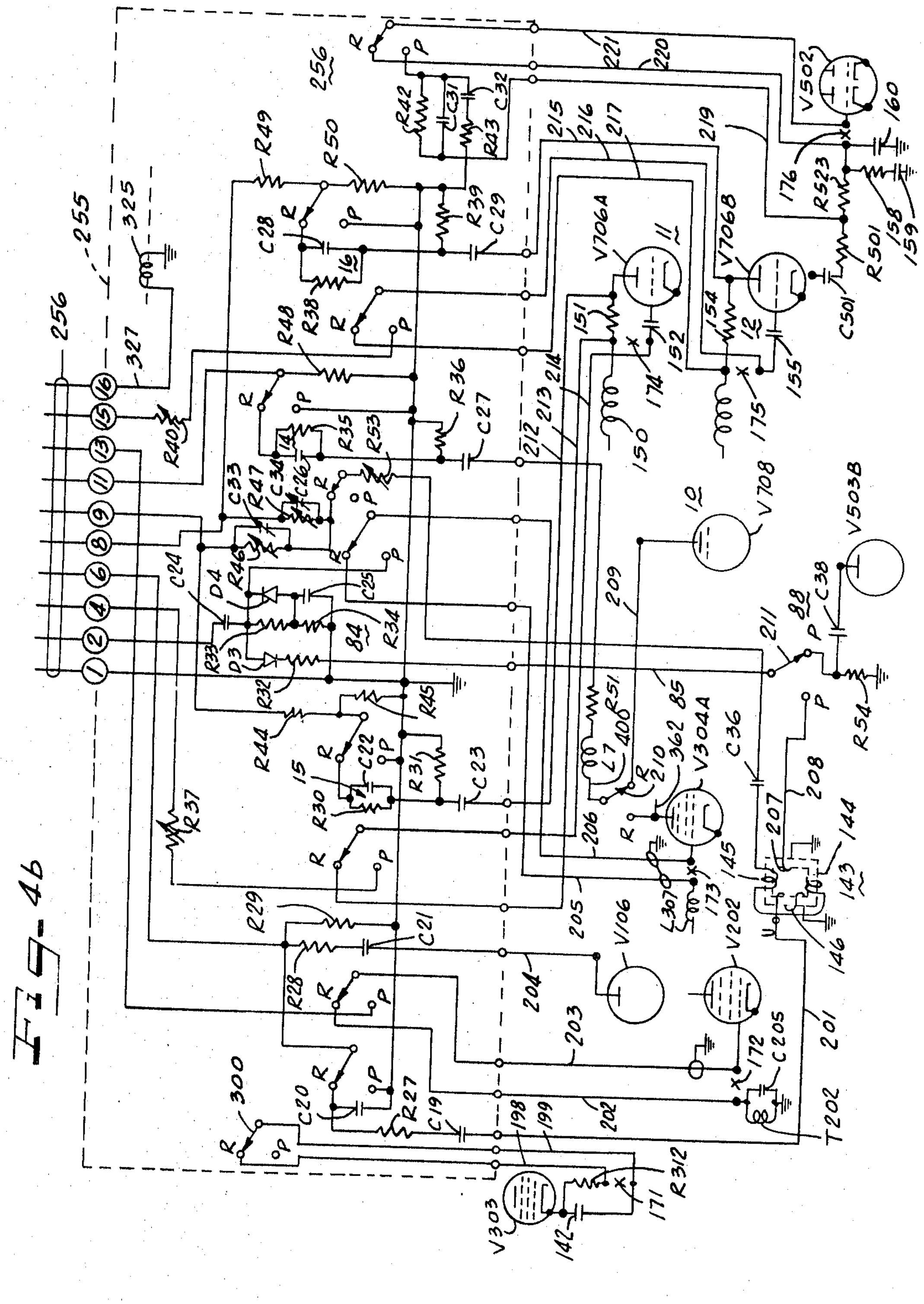

FIG. 4*a* is an electric circuit diagram showing portions of a preferred record-playback circuit in accordance with the present invention;

FIG. 4*b* is a circuit diagram showing further portions of a preferred record-playback circuit in accordance with the present invention, the circuitry of FIGS. 4*a* and 4*b* being connected by conductors of a cable indicated at the lower center of FIG. 4*a* and the top center of FIG. 4*b;*

Figure 5:
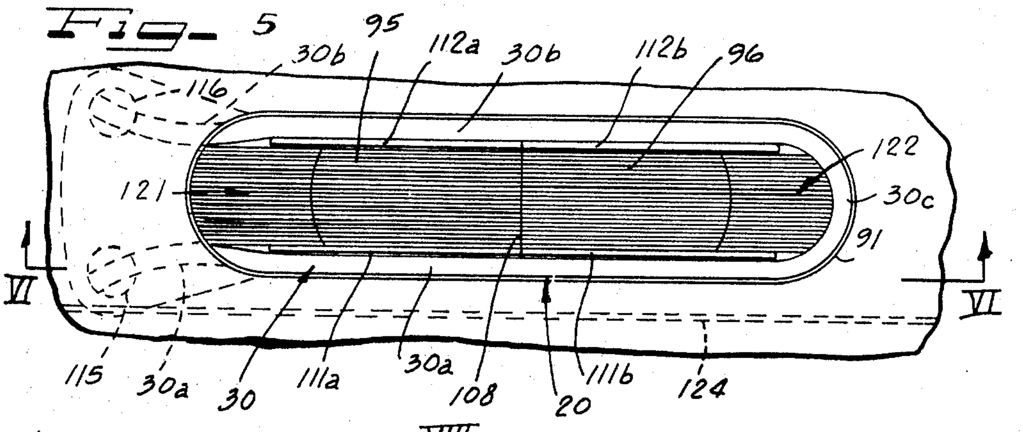
Figures 6, 7, 8, 9:
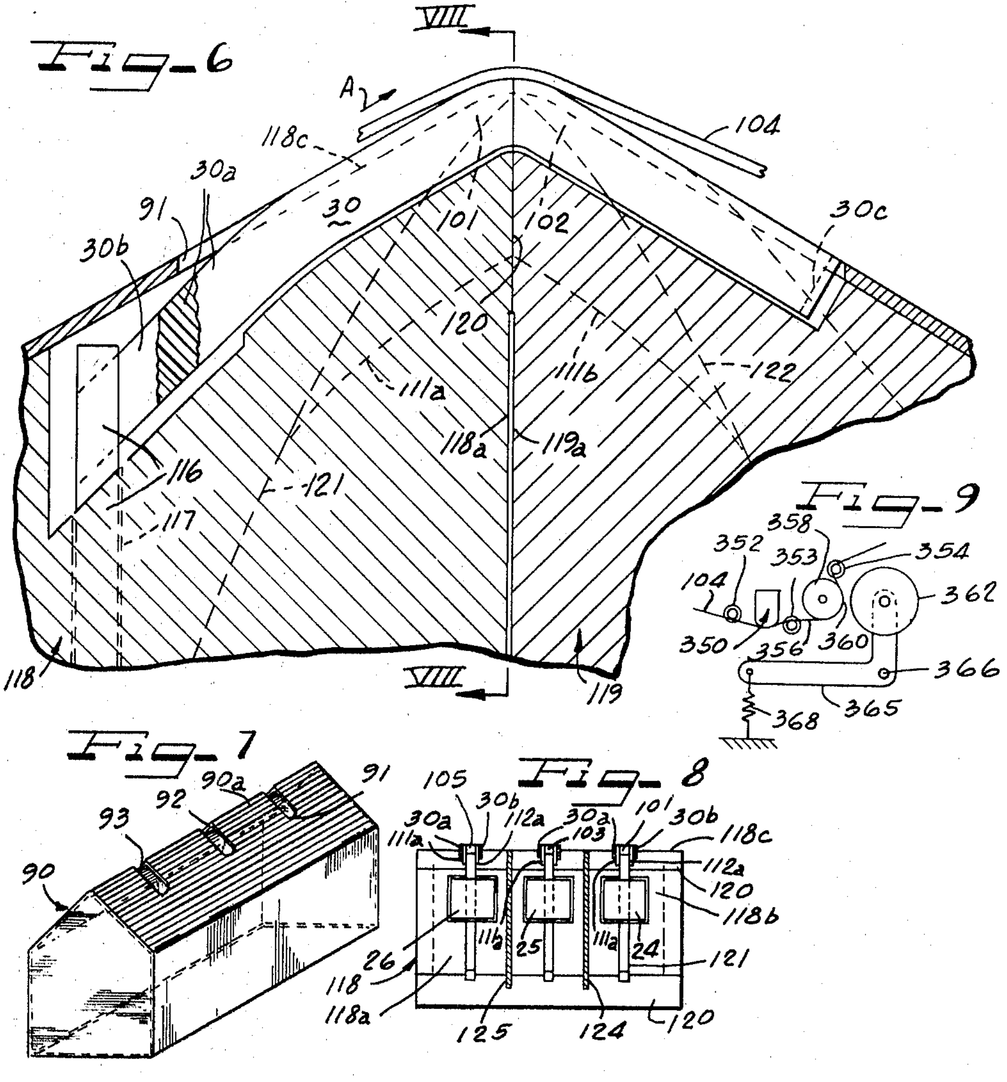
Figures 10, 13:
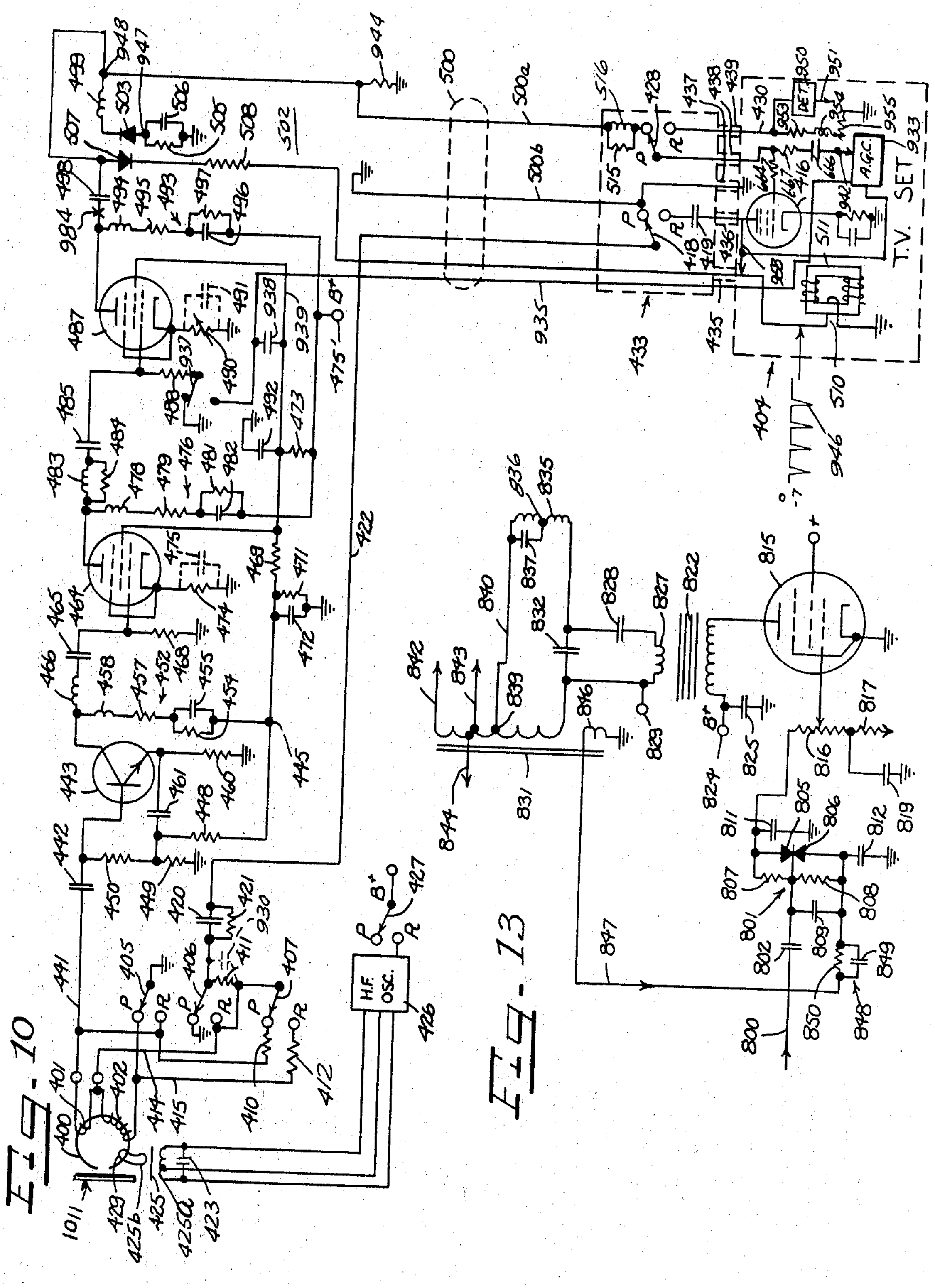
Figure 12:
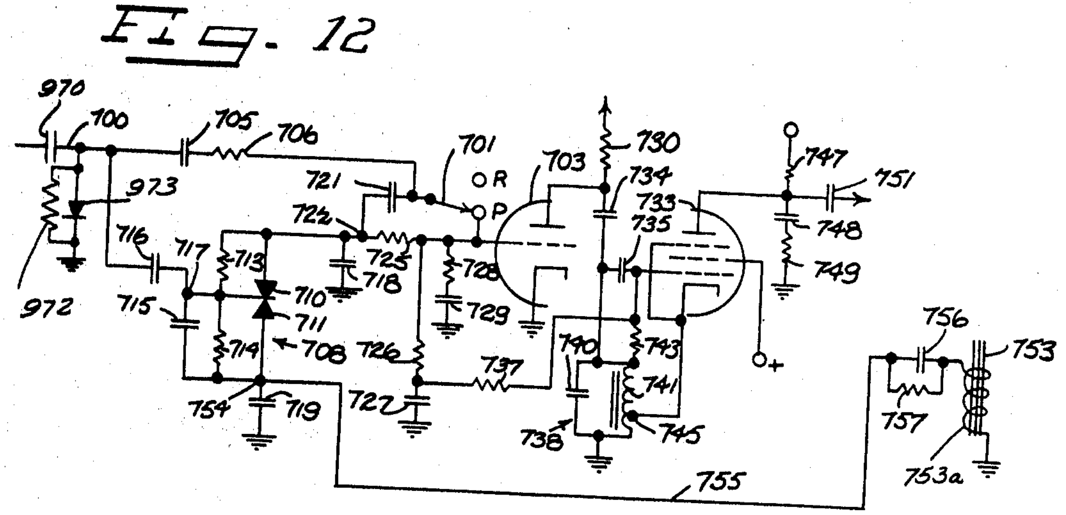
Figure 11:
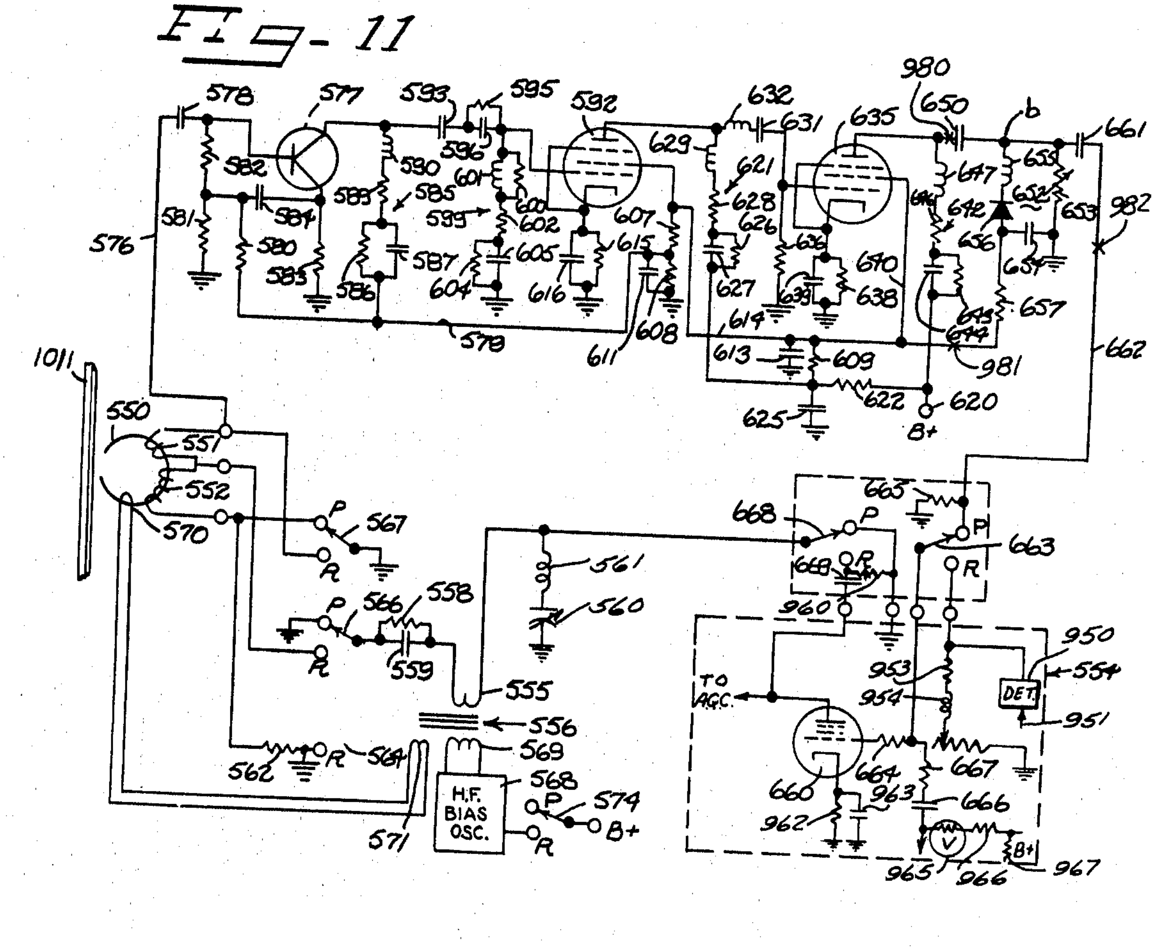

FIG. 5 is a partial plan view of a preferred head assembly in accordance with the present invention;

FIG. 6 is a partial vertical sectional view taken substantially along the line VI—VI of FIG. 5;

FIG. 7 is a perspective view of the housing for the head assembly of FIGS. 5 and 6;

FIG. 8 is a somewhat diagrammatic transverse sectional view illustrating a sub-assembly of the head construction of FIGS. 5 and 6;

FIG. 9 is a somewhat diagrammatic plan view of a preferred tape transport arrangement for the system of the present invention, the capstan pressure roll being indicated in its retracted position;

FIG. 10 is a schematic wiring diagram showing circuit connections and component arrangement used during a playback operation with the recording system of the eighth figure of my U.S. Pat. No. 3,495,046;

FIG. 11 is a schematic wiring diagram showing an alternate embodiment for use in place of the circuit of FIG. 10;

FIG. 12 is a schematic wiring diagram of a preferred horizontal sweep control circuit for a television receiver to be used for recording and playback of video signals in conjunction with the system of the present invention; and FIG. 13 is a schematic wiring diagram of an alternative horizontal sweep output circuit for use in place of the circuit of FIG. 12.

DESCRIPTION OF THE PREFERRED EMBODIMENTS

Description of FIGS. 1–9 From U.S. Ser. No. 62,601 Filed Aug. 10, 1970 Now U.S. Pat. No. 3,683,107

Figure 1:
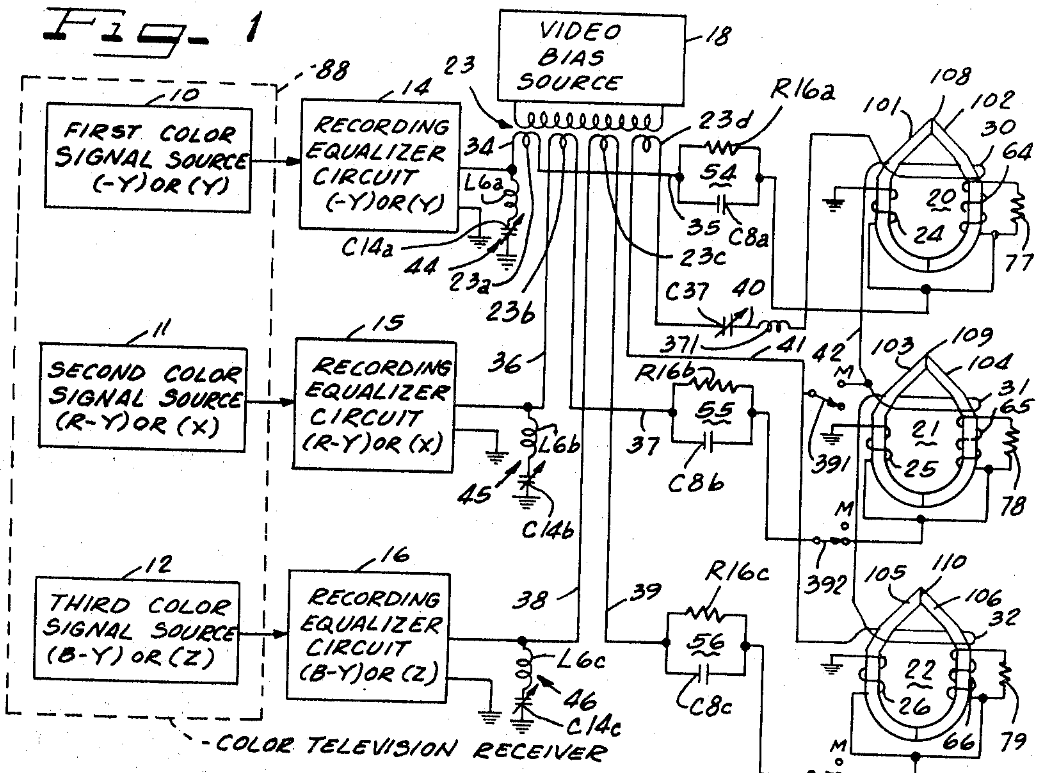
FIG. 1 is a diagrammatic view indicating a preferred color television recording system in accordance with the present invention.

FIG. 1 illustrates in diagrammatic form a preferred color television recording system in accordance with the present invention. In this preferred system, demodulated color signals are obtained from suitable sources such as indicated at 10, 11 and 12. In one type of commercial broadcast receiver, as for example the RCA CTC16XH chassis, demodulated signals known as the minus Y(—Y) signal, the R minus Y (R—Y) signal and the B minus Y (B—Y) signal may be obtained, respectively, from the plate of a third video amplifier tube, from the plate of a R minus Y amplifier tube and from the plate of a B minus Y amplifier tube. In general the (—Y) signal may be obtained from the cathode drive of commonly used three green color picture kinescopes, the (R—Y) signal from the red grid drive, and the (B—Y) signal from the blue grid drive. Alternatively the undelayed (—Y) signal is obtained from the first video amplifier. Alternatively, suitable demodulated color components known as the Y signal, the X signal and the Z signal may be obtained from the grids of the monochrome amplifier and color amplifier tubes respectively, and the color signal sources 10, 11 and 12 may represent suitable sources of these signals in such receiver circuitry, as another example. The term "color television signal" as utilized herein refers to a signal which may be utilized in reconstructing a color image without regard to whether the signal represents the actual variation of intensity of a particular color component of a light image. Thus, the term "color television signal" as utilized herein comprehends the conventional Y or (—Y) signal which is found in present receiver circuitry.

Recording circuitry components 14–16 may comprise suitable equalizer circuits and optionally may include amplification circuitry.

In the preferred circuit arrangement, a component 18 is included for supplying a high frequency bias current to the respective head units indicated at 20, 21 and 22. by way of specific example, the source 18 has been indicated as energizing a transformer 23 which has respective secondary windings 23*a*, 23*b* and 23*c* interposed in series between the respective recording circuits 14–16 and the respective record windings 24, 25 and 26 of the head units. The video bias source 18 is also illustrated as energizing cross field conductors 30, 31 and 32 in series by means of a secondary winding 23*d*.

In order to conveniently correlate the showing of FIG. 1 with the detailed circuit diagram of FIGS. 4*a* and 4*b*, conductors in FIGS. 4*a* and 4*b* corresponding to conductors 34–42 in FIG. 1 will be given corresponding reference numerals. To further facilitate a comparison of these figures, an adjustable capacitor C37 and bias frequency trapping circuits 44–46 have been indicated in FIG. 1 and have been given corresponding reference numerals in FIG. 4*a*. Similarly coupling circuits 54–56 have been indicated in FIG. 1 and the coupling circuit for the Y channel has been correspondingly designated in FIG. 4*a*. Thus, the details represented at 18, 23, 30–32, 43–46 and 54–56 are included in FIG. 1 solely for the purpose of correlation with the preferred system of FIGS. 4*a* and 4*b*, and these details are, of course, not necessary to the broad concepts of the present invention. Other modifications not falling with the scope of the embodiment illustrated in FIG. 1 will be described hereinafter.

Figure 2:
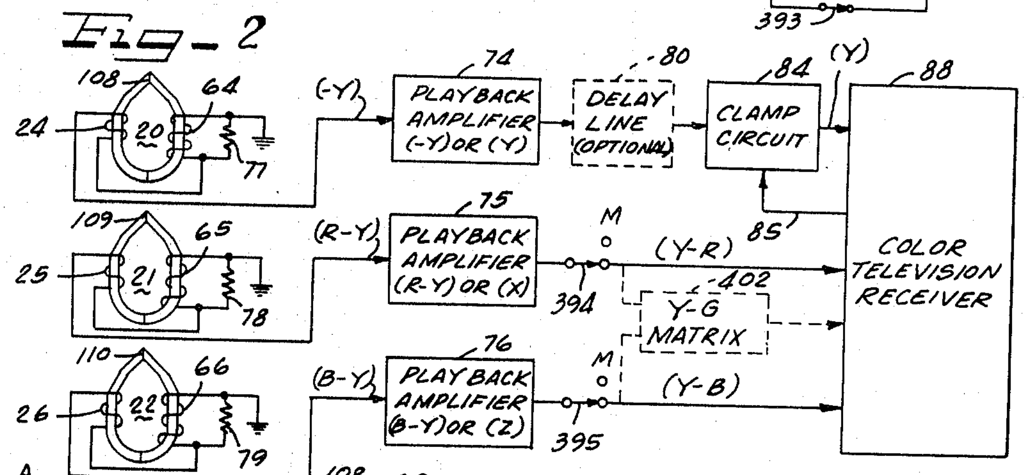
FIG. 2 is a diagrammatic illustration of a preferred color television playback system in accordance with the present invention.

FIG. 2 illustrates a preferred playback arrangement including head units 20–22 which are identical to the head units of FIG. 1. During playback, the low impedance windings 24–26 are connected in series with high impedance windings 64–66 to supply respective reproduced signals to playback amplifiers 74–76. Resistors 77–79 are connected in parallel with the high impedance windings 64–66 and are for the purpose of dampening any resonance effects in the high impedance coil associated therewith. The input impedance of components 74, 75, 76 are designed to further damp the resonances in heads 20, 21, and 22.

As indicated in FIG. 2, the reproduced signals may represent respective demodulated color signal components such as a (−Y) component, a R minus Y component and a B minus Y component or may represent Y, X and Z components as previously mentioned, for example. A delay line component 80 may be optionally provided in the Y channel, the delay line in the monochrome portion of the broadcast receiver being conveniently used. The three color component signals may be supplied to suitable points in a conventional color television receiver circuit, for example to the grid of a first video amplifier tube, to the grid of a R minus Y amplifier tube and to the grid of a B minus Y amplifier tube, respectively, where these are the signals normally present in such receiver circuitry. In the RCA CTC16XH the delay line in the monochrome circuit may be bypassed by supplying the (−Y) playback signal to the third video amplifier V708, and similarly the delay line may be bypassed in other receivers.

For convenience in correlating FIG. 2 with the detailed circuitry of FIGS. 4*a* and 4*b*, a clamp circuit has been indicated at 94 in FIG. 2 and the specific clamp circuit shown in FIG. 4*b* has been designated by the same reference numeral. To conform with FIG. 4*b*, a pulse input to the clamp circuit 84 at the horizontal line frequency is represented as being supplied by a line 85 in FIG. 2 conforming with the showing for line 85 in FIG. 4*b*. The component designated by reference numeral 88 in FIG. 2 represents commercial broadcast receiver circuitry suitably modified so as to receive reproduced signals from the other components of the system of FIG. 2. Suitable modifications of one type of commercially available receiver using the RCA CTC16XH circuits have been indicated in detail in FIG. 4*b*. As with the embodiment of FIG. 1, the embodiment illustrated in FIG. 2 is not intended to comprehend all modifications falling within the scope of the concepts of the present invention, certain components having been indicated, such as the disclosure of particular preferred head units and a preferred clamp circuit 84, for the purpose of facilitating disclosure of a preferred embodiment in conjunction with the detailed circuitry of FIGS. 4*a* and 4*b*. Modifications in the playback circuitry of FIG. 2 will generally correspond to modifications of the recording circuitry of FIG. 1. All such modifications of FIGS. 1 and 2 may be integrated into a combined recording and playback system, one preferred embodiment of which having been disclosed in FIGS. 4*a* and 4*b*. To illustrate this point, color component sources 10, 11 and 12 have been shown as contained within a dash rectangle 88 corresponding to the modified receiver circuitry 88 of FIG. 2. Broadly, however, the concepts of the present invention are not limited to the use or adaptation of conventional broadcast receiver circuitry, since any suitable source of color signal components may supply the signal to be recorded, and the reproduced color component signals may be supplied to any desired display or other utilization circuitry. Further, many features of the present invention are applicable to black and white television signal transducing, to other color systems, and to the transducing of wide band signals generally. Many uses and modifications have been discussed in the aforementioned copending applications and these discussions are specifically incorporated herein by reference with respect to the disclosure of FIGS. 1 and 2.

While numerous suitable head configurations have been described in the aforementioned copending applications, a preferred head configuration is illustrated in FIGS. 3–8 taken in connection with the diagrammatic showings of FIGS. 1 and 2. A housing 90 of magnetic shielding material may substantially completely enclose the head units 20–22, the tape engaging surface 90*a* of the housing having three elongated openings 91, 92 and 93. FIG. 7 for receiving the tape engaging pole faces 95–96, 97–98 and 99–100 (FIG. 3) of the respective head units 20, 21 and 22. The poles 101–102, 103–104 and 105–106 (FIG. 1) of the head units providing the tape engaging surfaces 95–100 have transversely aligned transducing gaps 108–110 therebetween for coupling of the respective head units with a tape record medium such as indicated at 104.

Each of the cross field conductors 30–32 may extend in a loop about the poles of the respective head units 20–22 as indicated in FIG. 5 for the conductor 30. Specifically it will be observed that the conductor 30 includes a first length portion 30*a* extending generally parallel to the direction of tape movement and directly adjacent the tape engaging polar faces 95 and 96 at one side of the head unit 20. A second length portion 30*b* of conductor 30 is connected with the conductor 30*a* by a reverse bend portion 30*c* and extends along the opposite side of the head unit 20 directly adjacent the tape engaging faces 95 and 96. As indicated in FIG. 6, each of the length portions 30*a* and 30*b* may generally conform with the tape path across the head assembly so that the top edge of the conductor 30 is in sliding contact with the tape travelling along the tape path for a substantial distance as shown in FIG. 6. The polar faces 95 and 96 are in sliding contact with the magnetizable surface of the tape as it travels across the head assembly, over the same distance as conductor 30. The side clearance between the poles 95, 96 and the high permeability casing 90 is quite narrow; being as small as 0.005 inch or less to give a good keeper action for isolation of adjacent channels. The conductor 30 is formed from thin ribbonlike material, and together with head core side support sections 111*a*, 111*b* and 112*a*, 112*b* and insulation fills the side clearance spaces between the core and housing.

As seen in FIGS. 5 and 6 the ends of the cross field conductor 30 may connect with vertical conductors such as indicated at 115 and 116 which extend on opposite sides of the magnetic core of head unit 20 and lead to terminals at the bottom of the housing. The conductors 115 and 116 may extend through passages such as indicated at 117 in the mounting block 118. The mounting block 118 together with a cooperating mounting block 119 are provided with mating surfaces such as indicated at 120 and 120*a* in FIG. 8 and with recessed portions such as indicated at 118*a* and 119*a* in FIG. 6. Each mounting block is also provided with suitable recesses such as indicated at 118*b* in FIG. 8 for receiving the windings 24–26. The mounting block 119 is, of course, provided with comparable recesses for receiving the windings 64–66 of FIG. 1. The mounting blocks also are provided with suitable recesses for receiving the respective core halves such as indicated at 121 and 122 in FIGS. 5, 6 and 8. The paths of the conductors such as 115 and 116 are of course, arranged so as to be clear of the core halves such as 121 and clear of the windings such as 24. The conductive parts such as 115 and 116 as well as the cross field conductors such as 30 are suitably insulated from the mounting blocks such as 118 and 119 where such blocks are of electrically conductive material. The cross field conductors are also suitably insulated from the housing part 90 where necessary.

Referring to FIG. 6, it will be noted that the cross field conductor part 30*a* and the core half 121 have been broken away to show the conductor part 30*b* extending into a receiving slot in the end of conductor 116. The configurations of core halfs 121 and 122 are preferably symmetrical.

Preferably shield plates are located as indicated at 124 and 125 for magnetically isolating the successive head units 20–22. The shield plates are preferably of magnetically soft high permeability magnetic material.

As seen in FIG. 8, the individual core halves such as 121 together with the associated cross field conductor such as 30 and the side plate sections such as 111*a* and 112*a* project slightly above the upper surface such as indicated at 118*c* of each of the mounting blocks so as to project into the openings 91–93 of the housing 90 with the upper surfaces of the core parts lying flush with the keeper surface 90a as illustrated in FIG. 6.

By way of a specific example, the head unit 20 may be located between the head units 21 and 22 (rather than as actually shown in the drawings), and the magnetic core of head unit 20 may have a width of 30 mils (1 mil equals 0.001 inch). The cores of the head units 21 and 22 may have a width of 21 mils. The overall width of the head unit 20 including the cross field conductor 30 and the side plate sections 111*a*, 111*b*, 112*a*, 112*b* together with suitable insulation may be 50 mils while the corresponding dimension of the head units 21 and 22 may be 41 mils. The center to center spacing between the successive head units may be 88.5 mils and the shield plates such as 124 and 125 may have a thickness of 6 mils. The side plate sections such as 111*a*, 111*b*, 112*a*, 112*b* may be of beryllium copper and have a thickness of 5 mils each. The cross field ribbons such as 30 may have a thickness of 5 mils each.

The bias frequency from source 18 may be in the range from 2.4 to 3.2 megacycles per second, for example 2.8 megacycles per second or from 4 to 4.4 MC for example 4.2 MC, in which frequency ranges the heads are efficient and the exact bias frequency signal adjustable by C15 does not interfere with the color or the sound circuits in the receiver. To further prevent such interference trap circuits 44–46, FIG. 4*a* are used. Good results may be obtained with a bias frequency of 3 megacycles per second or a bias frequency of 4 megacycles per second. Higher bias frequencies above 4.6 MC are usable, but require efficient heads as the X-field type. With this foregoing specific example, it will be understood that the channels of the tape 104 as viewed in FIG. 3 will have different signals recorded thereon. For example channels 104*a* and 104*d* would have the (R−Y) or (X) signal, the channels 104*b* and 104*e* would have the (minus Y) or (Y) signal and the channels 104*c* and 104*f* would have the (B minus Y) or (Z) signal recorded thereon.

Figure 3:
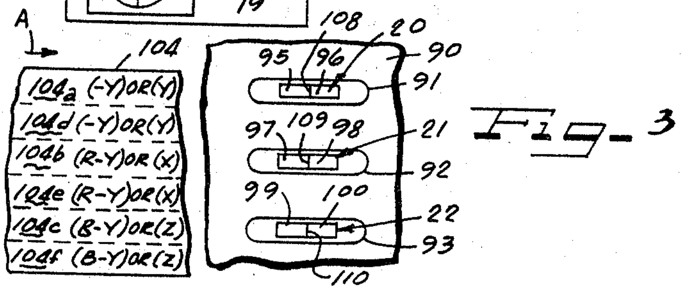
FIG. 3 is a diagrammatic partial plan view illustrating a preferred transducer system for recording and playback of color television signals.

For simplicity, the head units 20–22 may have the same width as actually illustrated in the drawings, so record tracks on the record medium 104 of equal width. As indicated in FIG. 3, the head units 20, 21 and 22 may be spaced apart in the lateral direction by multiples of the channel width so that the upper set of alternate channels 104*a*–104*c* receive signals (minus Y), (R minus Y) and (B minus Y) respectively as the tape 104 travels in the direction of arrow A, and the lower set of alternate channels 104*d*–104*f* receive signals (minus Y), (R minus Y) and (B minus Y) as the tape moves in the opposite direction.

Alternatively the audio signal or signals may be recorded as modulation on one or two of the signal tracks, preferably on the (R minus Y) and (B minus Y) signal tracks which have excess bandwidth beyond the requirements of the color information. Frequency modulation, phase modulation or amplitude modulation may be used as described in my pending application Ser. No. 393,282. Heterodyning the 4.5 megacycle per second sound carrier of a broadcast signal so that it is within the recording range of the tape system is a simple method which makes use of existing circuits in the receiver.

Description of the Specific Circuitry of FIGS. 4*a* and 4*b*

The general arrangement of the detailed circuitry of FIGS. 4*a* and 4*b* will be apparent from a comparison with FIGS. 1 and 2 since in FIGS. 4*a* and 4*b* reference numerals such as 10, 11, 12, 14, 15, 16, 18, 23, 24, 30, 34–46, 54, 64, 74, 77, 84, 85 and 88 have been located so as to indicate specific circuit elements corresponding to those represented in FIGS. 1 and 2.

For purposes of specific illustration, the components in the region 88 are in general conventional components of RCA Model CTC16XH color television chassis. The circuit is reprsentative of color TV circuits that are widely used. The conventional networks and individual components shown in FIG. 4*b* are tabulated as follows: tube V303 (type 6EJ7), capacitor 142, resistor R312, inductor T202, capacitor C205, sound demodulator tube V202 (type 6HZ6), audio output tube V106 (type 6AQ5A), inductor L307, first video tube V304A (type 6LF8), horizontal output transformer 143, horizontal output winding sections 144, 145 and 146, tube V503B, third video tube V708 (type 12BY7A), inductor 150, resistor 151, capacitor 152, (R minus Y) amplifier tube V706A (type 6QU7), inductor 153, resistor 154, capacitor 155, (B minus Y) amplifier tube V7063 (type 6QU7), capacitor C501, resistor R501, resistor R523, resistor 158, capacitor 159, capacitor 160, tube V502.

The following components within the general region of the receiver circuit 88 are new components having values as follows: inductor L7—500 microhenries, resistor E51—4,700 ohms, capacitor C36–1,000 micromicrofarads, resistor R54—47,000 ohms and capacitor C38—15 micromicrofarads.

The original circuit has been broken in a number of points as will be apparent to those skilled in the art, for example at the locations indicated by a small "*x*" and designated by reference numerals 171–176. At other places in FIG. 4*b*, tube elements, circuit components and conductive connections have simply been omitted for the sake of simplicity since such elements remain unchanged from the standard circuit.

Connections or additions to the standard RCA chassis comprise conductors 198 and 199, the conductor 201 connected to terminal U of the winding section 146 of the horizontal output transformer 143, conductors 202–206, a single turn winding 207 on the horizontal output transformer 143 together with a conductor 208 for coupling with conductor 85 and the clamp circuit 84 shown in FIG. 2, conductor 209 and switch 210 providing selective (minus Y) output from the plate of tube V304A or V708, inductor L7 and resistor R51, capacitor C36 connected to termnal No. 3 of winding section 145 of the horizontal output transformer, switch 211 providing in a left hand position coupling between conductor 208 and conductor 85 and in the illustrated right hand position connecting conductor 85 with the plate of tube V503B through capacitor C38 and conductors 212–221.

The top rectangle in FIG. 4*a* is designated by the reference numeral 74 since the circuit elements therein represent a preferred playback amplifier for the (minus Y) channel. The playback amplifier components 75 and 76 of FIG. 2 may utilize circuitry similar to that shown for component 74 in FIG. 4*a*.

The components in the lower dash line rectangle 250 in FIG. 4*a* include preferred circuitry for the video bias component 18 as well as the bias frequency trapping networks 44–46, an audio playback amplifier circuit 251 and a power supply circuit 252.

A tape transport control circuit is indicated by a dash rectangle 253 which may correspond to that shown in the seventeenth figure of my copending application Ser. No. 493,271 (now U.S. Pat. No. 3,531,600). In an actual embodiment of the present invention, however, supply and take-up reel motors are used with special torque rotors to provide drag on the supply spindle depending on the direction of tape travel, instead of the half wave rectifier and variable resistor which provide direct current drag in my previous disclosure.

The circuitry in the dash line rectangle 255 in FIG. 4*b* may be termed the adapter or coupling circuitry and consists of a junction box that receives a cable indicated at 256 from the recorder unit (represented by block 250 in FIG. 4*a*) and contains circuitry that is best located at the television receiver to minimize undesirable capacitance or stray coupling, and to simplify the cable connections. In other words, the adapter circuit 255 is physically disposed closely adjacent to the conventional video circuit components indicated in the lower part of FIG. 4*b*.

The adapter circuitry 255 includes preferred circuit elements for the equalizing circuits 14–16 of FIG. 1 and these circuits have been designated by the corresponding reference numerals to indicate the fact. Also included is preferred circuitry for the clamp circuit 84 of FIG. 2 and accordingly the reference numeral 84 has been applied in FIG. 4*b*. A stabilizing circuit 256 is indicated at the lower right of the box 255 and is associated with the horizontal control circuit of the receiver circuitry including elements C501, R501, R523 and 158–160.

Referring to FIG. 4*b*, resistors R37 and R40 in the circuit coupling the color playback preamplifiers to the R-Y and B-Y amplifiers in the TV set (in the adapter circuit 255) set the clamping levels of the (R minus Y) and (B minus Y) amplifiers V706A and V706B, respectively, by loading the grid circuits and thus determining the grid currents that flow as a result of pulses in the cathode circuits of the amplifier tubes V706A and V706B. The pulses are fed from the plate of a tube V707B of the conventional chassis to the cathodes of tubes V706A and V706B. Resistors R37 and R40 may be adjustable with values of 8,200 and 10,000 ohms, respectively, having been found to give a white background when no color picture is present. Without these resistors the playback color balance is seriously upset.

During recording, negative pulses from terminal 3 of the winding indicated at 145 of the horizontal output transformer are fed to the recording head circuit through series capacitor C36, series resistor R53 end RC networks R46, C33 and R47, C34. These networks shape the negative current pulses from the horizontal output transformer so that they effectively neutralize similar pulses from the output of the color amplifier tubes V706A and V706B. If the latter pulses are not cancelled they will be recorded as part of the color signal, and upon playback these pulses will upset the operating levels of the color circuits, giving incorrect color rendition. Also the presence of these unnecessary pulses tends to limit the recording levels or to overload the magnetic record tape. Alternatively it is possible to counteract during playback the effects of the color signal pulses if these are not neutralized. This may be done by applying a corrective bias to the grid or plate circuit of tubes V706A and V706B or the grids of the picture tube. It is preferable, however, to record the color signals without their blanking-interval pulses, or with these pulses greatly reduced, and this mode of operation has been illustrated in FIG. 4*b*.

Switch 300 in the adaptor circuitry 255 is in series with cathode resistor R312 of tube V303 and renders this IF stage inoperative during playback to prevent feedthrough of broadcast signals from interfering with the tape playback operation.

Inductor L7 and resistor R51 in the receiver circuitry 88 of FIG. 4b reduce loading of the television signal circuits by the connection to the recording head circuit, reduces interference from the high frequency bias circuit, and serves to increase the amplitude of the high frequency components of head energizing current because of a series resonance effect with the video head circuit capacitance. Resistors R44 and R49 in the adaptor circuit 255 similarly serve in the (R minus Y) and (B minus Y) head circuits leading to head units 21 and 22, respectively.

Switch 210 in the receiver circuitry 88 alternatively connects the (minus Y) recording head circuit either to the plate of the first video tube V304A or the plate of the third video tube V708. Thus, with the switch 210 in the position shown, a delay line is included in the circuit so that the (minus Y) signal is retarded with respect to the signal at V304A. The recording level and response may be varied by the brightness and contrast controls on the receiver when the connection is to V708; but is not dependent on these controls when the connection to V304A is used.

In FIG. 4*a*, power supply circuit 252 includes a bridge circuit giving an output voltage of 35 volts to the bias frequency oscillator circuit 18.

The circuitry of FIGS. 4*a* and 4*b* is converted from the recording mode illustrated to the playback mode by shifting the record-play selector switches from the "R" to the "P" positions. In playback mode the two video windings of each video head unit such as windings 24 and 64 are connected in series with each other with the phases of the voltages induced therein either in phase or 180° out of phase. A series opposing relation has been disclosed and described in detail in my aforementioned copending application Ser. No. 493,271 (now U.S. Pat. No. 3,531,600) and is specifically shown in FIG. 1. In this case, the overall circuitry is arranged to provide an improved response characteristic taking advantage of the fact that the high impedance windings such as 64 are resonant at a relatively lower frequency such as at about 250 kilocycles per second while the low-turns windings such as 24 are resonant at a much higher frequency such as at about two megacycles per second. The two video windings of each video head unit in series complement each other thereby extending the total frequency response.

With the series opposing relationship between windings 24 and 64, during playback at low frequencies the output of winding 24 subtracts from the output of winding 64 reducing the output of winding 64 by perhaps 20%, which is not significant. At frequencies above resonance of the high turns winding 64, the output of this winding reverses in phase and aids the output of winding 24. At still higher frequencies above the resonance of winding 24, the output of winding 24 reverses phase and again is of opposite phase relative to the output of winding 64, however at these frequencies the output of winding 64 is insignificant.

The phase shift in the playback amplifier such as 74 associated with the windings 24 and 64 is the reverse of that of the combined windings (as a function of frequency) so that an overall smooth phase characteristic (constant time delay) as a function of frequency results at the output of the amplifier 74, except at the very lowest and highest portions of the spectrum. Thus, the overall effect of the recording and playback system of FIGS. 1 and 2 is to produce at the output of the playback amplifiers 74–76 color video signal components having essentially the same phase relationship as the component signals supplied by the sources 10–12. Further, the frequency components of each color component signal such as the signal supplied by playback amplifier 74 have the same phase relationships as the corresponding frequency components of the original signal such as the one supplied from signal source 10.

The response of the playback amplifiers as a function of frequency is purposely made to drop rapidly at frequencies below about 300 to 600 cycles per second in order to reduce hum and low frequency transistor noise, giving important economies since it is not necessary to use elaborate shielding or expensive low-noise transistors in the playback amplifier circuitry. It has been found that boost in amplitude response as a function of frequency of perhaps 3 decibels to 10 decibels at frequencies above the low frequency cut-off, for example a boost in the frequency range from 600 cycles per second to 3,000 cycles per second, is beneficial in giving a smooth time delay characteristic at low frequencies, that is in giving a relatively constant time delay over the entire useful video range when this feature is used with the transducers and circuitry as described.

The pedestal setting or clamping circuit including capacitor C24, resistor R32, resistor R33, resistor R34, capacitor C25 and diodes D3 and D4 further removes hum components, sets the sync pulses at the correct level, and biases the video amplifier V304A in the television set to the proper operating value.

It will be understood that during playback of a recorded video signal, the reproduced signal will be supplied to the grid of amplifier tube V304A, and that the plate of the tube V304A is coupled by means of a connection such as indicated at 362 to succeeding stages of video amplification via existing circuits. The color television receiver 88 of course includes an image reproducing device such as a tri-color television tube.

At the highest frequencies of the effective bandwidth of the record-playback system, the playback amplifiers 74–76 provide adequate amplitude compensation in conjunction with the recording equalizer circuits 14–16, but phase compensation at these highest frequencies may not be exact. Such lack of exact phase compensation at the highest frequencies has been found to be very practical in an economical recorder, the result being a shift in fine structure of the image which is barely noticeable. It was previously considered that satisfactory compensation at these highest frequencies of the order of one megacycle per second and higher could only be accomplished with transmission lines or with complicated all-pass networks.

An overall response may be obtained in each video channel generally as indicated in the sixteenth figure of my copending application Ser. No. 493,271. The high frequency response of 75 and 76 may be reduced by changes as indicated in the table of component values and elsewhere in this application. There the response was shown as extending to 2.2 megacycles per second at the high end from about 300 cycles per second at the low end. This may be termed the bandwidth of the amplifiers. However the pedestal setting circuit effectively extends this to d-c (direct current). The normal recording level was approximately 35 to 40 decibels above the broad band noise level. These characteristics are considered satisfactory for a low-cost, non-professional recording unit. The frequency response indicated in the sixteenth figure of the copending applications results in a playback picture image quality of acceptable level. It is found, however, that in the recording process a rising response or amplitude level of recording current as a function of the frequency with constant input to the video amplifiers stage (V304A or V708, V706A and V706B) in the region from 10,000 cycles per second to 100 kilocycles per second is beneficial, and this rising response characteristic is provided by the recording circuits 14–16 for the respective video channels in the illustrated embodiment. This rising response characteristic for the recording circuits is indicated by curve 336 in FIG. 10.

With the transducer head units of the type illustrated in FIGS. 5–8 a normal operating level of signal current of about 1.0 milliamperes peak-to-peak in the 200 turn winding such as 24 is satisfactory. Saturation begins at about 4 to 8 milliamperes. A bias current of about 12 milliamperes may be superimposed on the signal current in the head unit 20, and bias currents of about 20 milliamperes may be superimposed on the signal currents in the head units 21 and 22, where the bias frequency is about 2.8 megacycles per second. The exact frequency is adjusted by adjusting capacitor C15 to prevent interference with the television set circuits. The values of bias current of 12 milliamperes and 20 milliamperes at a frequency of about 2.8 megacycles per second may be utilized in the absence of any bias current to the bias windings 30–32.

When the cross field windings 30–32 are energized, a current in the range from 1 to 5 amperes r.m.s. at the bias oscillator frequency may be employed and the bias currents to windings 24–26 may be reduced to about half the values given above, and a higher bias frequency may be used as for example 4.2 megacycles per second to 4.4 megacycles per second, or a bias frequency above 4.6 megacycles per second may be used.

If the cross field windings 30–32 are not used, a lower bias frequency is required and the overall response is not as good.

In the illustrated embodiment as in the embodiment of my copending application Ser. No. 493,271, (now U.S. Pat. No. 3,531,600) the recording level may be of the order of 8 to 10 decibels below tape saturation. The playback amplifier 74 and the similar amplifiers 75 and 76 are generally similar to the playback circuit shown in the eighteenth figure of my copending application Ser. No. 493,271 now U.S. Pat. No. 3,531,600). This circuit includes a negative feedback network as indicated at 308 between the first two stages of video amplification and serves to provide a phase shift compensating for the phase shift which occurs in the head response at and below the crossover region centering about the resonant frequency of the high impedance winding of each head unit such as the high impedance winding 64 of the head unit 20.

Referring to the ninth figure of my copending application Ser. No. 401,832, the negative feedback network 308 between the first two stages of video amplification in FIG. 4*a* (together with C9 R14, C6 R18, 39 L8 R54 and L3 R 12 C7) is designed to provide the phase correction in the curve designated 680 in the region designated by reference numeral 682. The phase shift as a function of frequency provided by the feedback network 308 which includes resistor R15, resistor R5 and inductor L2 in parallel and capacitor C3 together with the above mentioned networks compensates for the phase shift in head response in the region of resonance of the high impedance winding such as winding 64 for the head unit 20.

The maximum overall gain of the video amplifier circuit such as 74 varies between about 100 and 10,000 as a function of frequency. Actually the transistorized circuit shown herein and in the eighteenth figure of my copending application Ser. 493,271 gives greater high frequency response and higher gain than the vacuum tube circuit shown in the seventeenth figure of said copending application.

The difference in circuit constants as for example R15, L2, C3 in FIG. 4*a* and in the corresponding circuit of Ser. No. 493,172 accounts for the deeper valley in response of the latter which drops to an amplification of only about 15 at 150KC to match a different hed characteristic.

The high impedance windings 64–66 of the head units are loaded by resistor 77–79 but otherwise not connected during recording and become effective during playback, in the illustrated embodiment. These head windings 64–66 are shunted by resistors 77–79 to flatten the resonance response characteristics of each high impedance winding at the resonance frequency of this winding with respect to the associated circuit capacitance. The low impedance winding of each head unit, namely windings 24–26 of head units 20–22, (together with the associated high impedance winding) is damped by the input resistance of the first transistor Q1 which input resistance is comparable to the impedance of winding 24 at medium and high frequencies within the range of the system. The input impedance of transistor Q1 is determined by the networks connected to its emitter and varies with frequency. The two conductor double-shielded cable generally designated by the reference numeral 340 connects the head unit 20 to the input circuits and prevents hum and extraneous signal pick-up by the two conductors and inner shield within the cable.

Inductance L1 removes radio frequency pick-up of energy being broadcast from local transmitters which pick-up might otherwise overload the input circuits.

Unless other wise indicated, each of the features described herein with respect to the head unit 20 and its associated video amplifier 74 applies also to the head units 21 and 22 and their playback amplifier components 75 and 76.

The direct current operating points of the transistors Q1, Q2 and Q3 are stabilized by negative feeedback to the emitter of transistor Q1 via circuit 320 leading to resistor R2, and by feedback via circuit 310 to the base of transistor Q1 through resistor R1. The high degree of feedback makes the circuits insensitive to variations in transistor characteristics, supply voltage, temperature, etc. The capacitor C5 by-passes the feedback network R8, R9 associated with feedback circuit 320 allowing the amplifier to have normal gain at operating frequencies above about 300 to 800 cycles per second while substantially reducing the overall amplifier gain at frequencies below about 300 to 800 cycles per second relative to such normal gain and thus reducing hum and instability. In the circuit specifically disclosed herein, capacitor C5 has a capacitance value of 250 microfarads. Lower values of capacitance for capacitor C5 in relation to the values of resistors R8 and R9, as for example 60 microfards, will raise the frequency below which the amplification drops rapidly; and just above this higher cut-off frequency, the amplifier will exhibit a rather broad peaking of the response characteristic as a function of frequency. A rise in response of this kind constitutes a desirable feature from the standpoint of improving the transient and phase response, where the low frequencies are cut off.

The frequency and phase response of the playback amplifier 74 is shaped by the feedback circuit 308 including network R15, C3, R5 and L2, so as to give a strongly falling characteristic in the range from about 300 cycles per second to 100 kilocycles per second, the response peaking in the neighborhood of 600 cycles per second and then sharply falling (so far as the effect of feedback circuit 308 is concerned) until the frequency reaches a relatively low value at a frequency of 100 kilocycles per second. The effect of the feedback circuit 308 together with the effect of resistor R14 and capacitor C9 in the emitter circuit of transistor Q1, the effect of resistor R18 and capacitor C6 in the emitter circuit of transistor Q3, and the effect of the network consisting of resistor R12 and inductor L3 in the collector circuit of transistor Q3 gives an overall response characteristic to the amplifier 74 as a function of frequency which exhibits a very sharply rising response of increasing slope in the range above about 300 kilocycles per second to the upper limits of the system which upper limit may be in the range from 1.5 megacycles per second to 4.5 megacycles per second.

As previously described, when the windings such as 24 and 64 on the head unit 20 are connected in "bucking" relation with respect to low frequencies, the phase of the induced voltage in winding 64 undergoes a reversal as a function of frequency as the frequency is increased through the resonance value for the winding 64, so that the induced voltage in winding 64 aids the induced voltage in winding 24 at high frequencies between the resonance frequency of winding 64 and the resonance frequency of winding 24. The amplifier frequency response and phase response is shaped to complement that of the head, giving smooth response, uniform delay, and a good transient response over the frequency spectrum of interest.

It has been found that an advantageous characteristic may also be obtained from a series aiding connection of a low impedance and a high impedance winding such as windings 24 and 64 of head unit 20 if certain criteria are met: (1) the resonant frequencies of the windings must be spaced properly; and (2) the resistive loading especially on the high impedance winding such as 64 must be enough so that phase reversal of the net output from the windings does not take place in the transition frequency spectrum where both windings are contributing substantially to the output.

If winding 64 is reversed to give series aiding operation, the phase of the output from the preamplifier 74 will be reversed. An additional stage of amplification will restore the correct phase, or other suitable change in the circuitry may be used.

Referring to FIG. 4*b*, the diodes D3 and D4 in the clamp circuit 84 are preferably of the silicon junction type having a very high resistance in the forward direction until the forward potential exceeds about 0.5 volt to 0.7 volt. This feature has been found very advantageous, as it allows a precise setting of the sync pedestal level and still permits the picture signal to make large excursions without clipping. An example of a preferred type for diodes D3 and D4 is the 1N463A. The one-turn loop 207 on the horizontal output transformer 143 of the television receiver provides negative pulses to the clamp circuit 84 in the left-hand position of switch 211. In the right-hand position of the switch 211, the horizontal sync pulses from the plate of the sync separator tube V503B are supplied to the clamp circuit 84. In either event, the magnitude of the pulses is about 12 volts peak (relative to ground). The clamp circuit 84 including diodes D3 and D4 sets the negative level of the output video signal from the playback amplifier 74 as well as providing a direct current bias for the video amplifier tube Y304A in the television receiver 88. As indicated in FIG. 2, only one clamp circuit is provided in the recorder, and this is preferably associated with the output of the monochrome playback amplifier 74. With this arrangement, it will be apparent that the system of FIGS. 1 and 2 may be utilized to record and playback monochrome broadcast television signals as well as color signals. This takes place automatically when recording while the TV set is picking up a monochrome signal. By switching out the heads 21 and 22 during recording and playback, and setting the (−Y) head 20 to cover successive channels including those which would otherwise be used by the color signals, more recording time is obtained on a given roll of tape.

The flutter in the tape transport may cause deviations in the desired rate of the synchronizing pulses in the reproduced video signal. FIG. 4*b* indicates at 256 modifications in the horizontal control circuit (associated with tube V502) of the television receiver. These modifications enable the horizontal sync circuits of the receiver to follow any deviations in the reproduced sync pulses.

As illustrated in FIGS. 4*a* and 4*b*, the audio winding 271 during recording may receive its audio signal current from the audio output tube V106 via capacitor C21 and resistor R28, while audio bias frequency current is supplied from the winding section 146 of the horizontal output transformer 143 through capacitor C19 and resistor R27.

During playback, the audio signal current induced in the winding 271 is supplied via capacitor C10 and inductor L5 to the base of a transistor Q4 which provides audio amplification. The output of the audio amplifier 251 is supplied via capacitor C11 to the grid of the sound demodulator tube V202 of the receiver circuitry 88. The "discriminator" tube V202 serves as an audio amplifier during tape playback. The transistor Q4 of the audio amplifier 251 may preferably be a type 2N3391A.

When the cable 256 is unplugged from the adaptor circuitry 255 the receiver circuitry 88 may be utilized independently of the circuitry of FIG. 4*a* to receive and display broadcast television signals. In this case, the switches of the adaptor circuitry 255 are placed in record mode. If the various switches are relay operated, their normal positions would be in the record mode, and unplugging of the cable 256 would deenergize the relay or relays to automatically place the adaptor circuitry 255 in the record mode. A suitable relay coil is indicated at 325 in FIG. 4*b*, and this relay coil is shown as being energized from the power supply 252, FIG. 4*a*, via conductor 327 of cable 256. The relay coil 325 preferably controls each of record-play selector switches, moving the switches from "R" to "P" position when energized. Simply by way of example when cable 255 is coupled to the adaptor 255, the relay 325 may be energized to place the circuitry of adaptor 255 in playback mode by manually shifting switch 330 indicated in FIG. 4*a* to the lower play position. The circuitry of FIG. 4*a* is preferably adjacent the tape deck, and the selector switches of FIG. 4*a* are ganged for conjoint manual operation with switch 330. Thus all of the record play switches in both the recorder and TV set are shifted by operating a single control. Switch 330 may itself be automatically rather than manually operated.

FIG. 9 illustrates diagrammatically a preferred tape transport arrangement wherein the reference numeral 350 indicates a shiftable head assembly including the audio head 270 and the video head assembly contained within the housing 90. Preferably the head assembly 350 includes a (minus Y) head unit 20 located between the head units 21 and 22 and the head units have the dimensions previously described. The audio head unit or units of the head assembly 350 are then located as indicated in the fourth figure of my copending application Ser. 439,340 and as previously described.

Tape guides for the tape 104 are indicated at 352, 353 and 354 so as to provide a tape path portion 356 between the head assembly 350 and capstan 358 and a second tape path portion 360 where capstan pressure roller 362 acts. In accordance with an important concept of the present invention, it will be noted that the tape path portion 360 is directed generally at right angles relative to the tape path portion 356, and particularly that the capstan pressure roller 362 acts against the capstan 358 in a direction generally parallel to the tape path portion 356. More specifically, the capstan pressure roller 362 is illustrated as being mounted on an arm 365 which is pivotal on a pin 366 with the arm being urged in the counterclockwise direction by means of a tension spring 368 acting on the arm 365. The tension spring 368 exerts sufficient force so that the capstan roller 362 acts firmly against the capstan (through the tape 104) and prevents flutter of the capstan 358 in the direction of the tape path portion 356. It will be observed that any "play" in the bearings of the capstan 358 will thus result only in possible flutter of the capstan 358 in the general direction of the tape path portion 360 rather than in the direction of the tape path portion 356. Any flutter of the capstan 358 in the direction of the tape path portion 360 will not substantially affect the tape motion across the head assembly 350 because of the fact that such flutter is effectively at right angles to the direction of the tape path between the head assembly 350 and the capstan 358.

As described in my previous applications, the capstan 358 is preferably effective to provide uniform motion in each direction of movement of the tape 104 across head 350 so that only a single capstan is required driven by a reversible constant speed motor. The audio heads need not be symmetrical relative to the video head units if the same head configuration is used both for recording and playback of the audio and video signals. Further, time lags between the audio and video signals on playback resulting from a minor difference in placement of audio record and playback heads are not noticeable where the tape 104 travels at a relatively high speed.

During recording the component of magnetic biasing flux produced by the cross field windings 30–32 should have the proper phase relation to the component produced by bias frequency current in the recording windings 24–26. This may be accomplished by tuning capacitor C37 associated with cross field conductor 40 in FIGS. 1 and 4*a*. The capacitor C37 forms part of a circuit having a series resonance in the region of the bias frequency, so that the phase of the bias current may be advanced or retarded by tuning capacitor C37 from one side of resonance to the opposite side. In some cases it is found advantageous to increase the inductance of the X-field circuit by inserting an inductance in the lead 40, as indicated at 371. Alternatively, a phase shifting network may be inserted in conductors 40 and 41 of the cross field bias circuit or in the signal winding bias circuit associated with windings 23*a*–23*c*.

For bi-direction tape transport, an alternative mode of operation is with the bias field component produced by cross field winding 30 having a phase angle of approximately 90° relatively to the bias field component produced by the winding 24, so that the bias frequency magnetic field associated with each head unit will be similar in each direction of movement of the magnetic tape 104.

The preferred circuit values of a successfully operating system in accordance with the present invention are given in the following tabulation.

Exemplary Circuit Values

| | | | | |
|---|---|---|---|---|
| Video Head Circuits, FIG. 4*a* | | | | |
| Windings 24, 25, 26 | | each | 200 | turns |
| Windings 64, 65, 66 | | each | 1200 | turns |
| Resistors 77, 78, 79 | | each | 8,200 | ohms |
| R16*a*, R16*b*, R16*c* | | each | 10,000 | ohms |
| C8*a*, C8*b*, C8*c* | | each | 100 | micromicrofarads |
| Video Playback Amplifier 74, FIG. 4*a* | | | | |
| R1 | 39,000 ohms | C1 | 25 | microfarads (electrolytic) |
| R2 | 150 ohms | C2 | 15 | microfarads (electrolytic) |
| R3 | 33,000 ohms | C3 | .01 (10,000 | microfarad micromicrofarads) |
| R4 | 5,600 ohms | C4 | 60 | microfarads (electrolytic) |
| R5 | 10,000 ohms | C5 | 250 | microfarads (electrolytic) |
| R6 | 56 ohms | | | |
| R7 | 3,300 ohms | C6 | .005 (5,000 | microfarad micromicrofarads) |
| R8 | 5.6 ohms | C7 | 0.1 | microfarad |
| R9 | 150 ohms | C9 | .0005 (500 | microfarads micromicrofarads) |
| R10 | 22 ohms (adjustable) | C39 | 0.03 | microfarad |
| R11 | 470 ohms | L1 | 10 | microhenries |
| R12 | 470 ohms | L2 | 240 | microhenries |
| R14 | 22 ohms | L3 | 50 | microhenries |
| R15 | 3,300 ohms | L4 | 50 | microhenries |
| | | L8 | 240 | microhenries |
| R17 | 180 ohms | Q1 | 16L64 | (Manufactured by General Electric Co. of U.S.A.) |
| R18 | 33 ohms | Q2 | 16L64 | (Manufactured by General Electric Co. of U.S.A.) |
| | | Q3 | 16L64 | (Manufactured by General Electric Co. of U.S.A.) |

The terminal B+ receives a direct current voltage relative to ground of 18 volts.

Resistor R19 has been replaced by a short circuit in amplifier 74. Resistor R19 is indicated in FIG. 4*a* so as to show its location in amplifiers 75 and 76.

Video Playback Amplifiers 75 and 76, FIG. 2

The circuit arrangement and circuit values for amplifiers 75 and 76 are the same as for amplifier 74 except that: (1) capacitor C9 and resistor R14 are eliminated in amplifiers 75 and 76; (2) inductor L2 and resistor R5 are replaced by a short circuit in amplifiers 75 and 76; and (3) elements R6, L8 and C39 are omitted in amplifiers 75 and 76. In amplifiers 75 and 76 there is an open circuit in place of the circuit comprising resistor R14 and capacitor C9 of amplifier 74, and in place of the circuit comprising R6, L8 and C39.

| | | |
|---|---|---|
| Audio Playback Amplifier 251, FIG. 4*a* | | |
| R20 | 1.5 | megohms |
| R21 | 100,000 | ohms |
| R22 | 220,000 | ohms |
| C10 | 20 | microfarads (electrolytic) |
| C11 | .01 | microfarad |
| L5 | 10 | microhenries |
| Q4 | 2N3391A Transistor Type | |
| Power Supply 252, FIG. 4*a* | | |
| R13 | 680 | ohms |
| C12 | 500 | microfarads (electrolytic) |
| C13 | 500 | microfarads (electrolytic) |
| C13A | 500 | microfarads (electrolytic) |
| R52 | 10 | ohms |

Continued

| | | |
|---|---|---|
| D1 | = | 1N1692 |
| D2 | = | 1N1692 |
| D1A | = | 1N1692 |
| D2A | = | 1N1692 |

Video Bias Oscillator 18, FIG. 4*a*
Frequency 3.6, 4.2, or 4.7 + megacycles per second

| | | | |
|---|---|---|---|
| R23 | | 6800 | ohms |
| R24 | | 6800 | ohms |
| R25 | | 5.6 | ohms |
| R26 | | 5.6 | ohms |
| C15 | (Adjustable) | 200 | micromicrofarads to 2000 micromicrofarads |
| C16 | | 300 | micromicrofarads |
| C17 | | 300 | micromicrofarads |
| C18 | | .05 | microfarads (50,000 micromicrofarads) |
| Q5 | | 7A30 | Manufactured by General Electric Co., USA |
| Q6 | | 7A30 | Manufactured by General Electric Co., USA |

Video Bias Circuits, FIGS. 1 & 4*a*

| | | |
|---|---|---|
| C14*a* (adjustable) | 8 | micromicrofarads to 80 micromicrofarads |
| C14*b* (adjustable) | 8 | micromicrofarads to 80 micromicrofarads |
| C14*c* (adjustable) | 8 | micromicrofarads to 80 micromicrofarads |
| L6*a* | 100 | microhenries |
| L6*b* | 100 | microhenries |
| L6*c* | 100 | microhenries |

Adaptor Circuit 255, FIG. 4*b*

| | | | | |
|---|---|---|---|---|
| R27 | 12,000 ohms | C19 | .006 (6,000 | microfarad micromicrofarads) |
| R28 | 83,000 ohms | | | |
| R29 | 100,000 ohms | C20 | .005 (5,000 | microfarad micromicrofarads) |
| R30 | 47,000 ohms | | | |
| R31 | 470,000 ohms | C21 | .05 (50,000 | microfarad micromicrofarads) |
| R32 | 47,000 ohms | | | |
| R33 | 680,000 ohms | C22 | 200 | micromicrofarads |
| R34 | 470,000 ohms | C23 | .25 | microfarad |
| R35 | 47,000 ohms | C24 | .002 (2,000 | microfarad micromicrofarads) |
| R36 | 470,000 ohms | | | |
| R37 | 8,200 ohms (adjustable) | C25 | .05 (50,000 | microfarad micromicrofarads) |
| R38 | 47,000 ohms | | | |
| R39 | 470,000 ohms | C26 | 200 | micromicrofarads |
| R40 | 10,000 ohms (adjustable) | C27 | .25 | microfarad |
| | | C28 | 200 | micromicrofarads |
| | | C29 | .25 | micromicrofarads |
| R42 | 1,000,000 ohms | C31 | 200 | micromicrofarads |
| R43 | 100,000 ohms | C32 | 470 | micromicrofarads |
| R44 | 5,600 ohms | | | |
| R45 | 10,000 ohms | | | |
| R46 | 1,500,000 ohms (adjustable) | | | |
| R47 | 1,500,000 ohms (adjustable) | C33 | 8 | micromicrofarads (adjustable) |
| R48 | 10,000 ohms | C34 | 8 | micromicrofarads (adjustable) |
| R49 | 5,600 ohms | | | |
| R50 | 10,000 ohms | | | |
| R53 | 120,000 ohms (adjustable) | | | |
| D3 | 1N463A | | | |
| D4 | 1N463A | | | |

Television Receiver Circuitry, FIG. 4*b*
(added components)

| | | | | |
|---|---|---|---|---|
| R51 | 4700 ohms | C36 | 1000 | micromicrofarads |
| R54 | 47,000 ohms | C38 | 8.2 | micromicrofarads |
| L7 | 500 microhenries | | | |

The components R51, R54, L7, C36 and C38, and particularly resistor R54 and capacitor C38 may be physically located on the chassis of adaptor circuit 255. If components R54 and C38 were in the adaptor, switch 211 could be placed in the adaptor also, or conductor 85 could be permanently connected to the plate of tube V503B, and switch 211 omitted.

An improvement in vertical synchronizing has been obtained by increasing the value of the conventional component R504 from 200,000 ohms to 1.5 megohms.

Capacitor C37, FIGS. 1 and 4*a*, is adjustable from 100 micromicrofarads to 1,000 micromicrofarads; a typical setting is approximately 500 micromicrofarads, where the oscillator frequency is 4.2 megacycles per second.

Capacitor C35 bypasses high frequencies and is associated with the B+ lead 335 energizing each of the playback amplifiers 74, 75 and 76; its value may be 0.05 microfarad.

The resistor R17 and the corresponding resistors in playback amplifiers 75 and 76 may be of adjustable value and may be adjusted to set the direct current operating bias of the amplifiers 74–76.

The cable 256 may have a plug for fitting into a socket on the chassis of adaptor circuit 255.

In certain cases in the foregoing tabulation, a single value has been given for a variable capacitor or resistor. This single value represents a selected operating value. Suitable ranges of adjustment for these variable components are listed as follows:

| | |
|---|---|
| R10 | 0 to 50 ohms |
| R37 | 0 to 15,000 ohms |
| R40 | 0 to 25,000 ohms |
| R46 | .5 to 3 megohms |
| R47 | .5 to 3 megohms |
| C33 | 4 micromicrofarad to 16 micromicrofarads |
| C34 | 4 micromicrofarad to 16 micromicrofarads |

While a value of 15 micromicrofarads for capacitor C38 has been referred to earlier in this specification, the value of 8.2 micromicrofarads given in the foregoing tabulation has now been found to be preferable.

As previously mentioned, the system of FIGS. 1 and 2 may be utilized for recording broadcasts of monochrome signals. In this event it is advantageous to disable the color signal head units 21 and 22. Referring to FIG. 1, a first disabling switch 391 is indicated which in its upper monochrome position serves to by-pass cross field windings 31 and 32. Further switches 392 and 393 disconnect the signal windings of head units 21 and 22 so that the superimposed signal and bias current will not reach the head units 21 and 22. In FIG. 2, switches 394 and 395 may be utilized for disconnecting playback head units 21 and 22 during playback of a monochrome signal which may be recorded on successive channels such as the six channels shown in FIG. 3. The switches 391–395 may be ganged for conjoint operation between their lower and upper positions and may be arranged for manual actuation.

Referring to FIG. 4*b*, the resistors R31, R36 and R39 serve to maintain the upper terminals respectively of capacitors C23, C27 and C29 at direct current ground potential (while the circuitry is in the playback mode) so as to prevent surges through the associated head windings during switching. These coupling capacitors have appreciable direct current potential across them during recording so that in the absence of the resistors, a charging of the capacitors would occur through the associated head windings when switching the circuitry between playback and record mode. Such current surges through the head windings would tned to produce residual magnetization of the head cores. (Such residual magnetization has various detrimental effects including noise and possible partial erasure of a signal recorded on the record medium.) Referring to the circuitry of FIGS. 4*a* and 4*b*, it will be observed that the video windings such as 24 have their upper terminals at direct current ground potential in the recording mode so that no current surges to the head windings will be produced where the upper terminals of the capacitors are maintained at direct current ground potential during switching.

Referring to the block diagram of FIGS. 1 and 2, in order to record the X and Z signals, suitable amplifier stages would have their respective inputs connected to the output of the X and Z demodulators, or to the grid circuits of tubes V706A, and V706B of the receiver circuitry shown in FIG. 4*b*. The outputs of such amplifier stages would then be connected to the recording equalizer circuits 15 and 16, respectively. Thus, in this case, the television receiver circuitry together with the amplifier stages would constitute the signal sources 11 and 12. Referring to FIG. 4*b*, the plates of the amplifier stages (whose grids are connected to the grids of tubes V706A and V706B) would be connected to conductors 212 and 215 in FIG. 4*b*, and the connection of the plates of tube V706B, and V706B with conductors 212 and 215 would be omitted. Similarly the (−Y) signal can be supplied by an amplifier stage whose input is connected to the grid of V304*a* or V708, and whose output is connected to 400 with switch 210 open.

The added video amplifier stages for the X and Z signals would not mix the signals, as actually occurs in the cathode circuits of tubes V706A and V706B. Each such amplifier stage may conveniently be provided by one-half of a single type 6OU7 double triode, with the B+ and filament power therefor supplied from the television receiver 88. The cathodes of such triode sections would be maintained at alternating current ground potential as by means of a large by-pass capacitor. For playback of the recorded X and Z signals, the outputs of the playback preamplifiers 75 and 76 would be applied to the grid circuits of tubes V706A and V706B, respectively, as indicated for example in FIG. 4*b*.

Referring to FIG. 1, if the (−Y), (R−Y) and (B−Y) signals are to be recorded, the sources 10–12 may include the television circuitry of FIGS. 4*b*, and the output from components 10–12 in FIG. 1 may be provided by the plate circuits of tubes V304A, V706A and V706B in FIG. 4*b*. Alternatively, to prevent loading of the television set circuits and for better matching to the recording circuits, separate amplifier stages or cathode follower stages may be used for the color channels, with their inputs connected to the plate circuits of tubes V706A and V706B, respectively, and their outputs connected to conductors 212 and 215; or with their inputs connected to other suitable R−Y and B−Y sources such as appropriate demodulator stages of a broadcast television receiver. When recordings have been made utilizing R−Y and B−Y sources, the playback signals from amplifier components 75 and 76 in FIG. 2 may (1) be matrixed at circuit 402 to give a G−Y signal if the color television set does not have this type of matrixing; or (2) the television receiver circuits may be modified for such matrixing during tape playback if the circuits do not normally provide the correct type of matrixing. By way of example, a G−Y signal may be derived from R−Y and B−Y signals by mixing 0.51 parts of the R−Y signal with 0.19 parts of the B−Y signal, and reversing the phase of the resultant signal. The matrixing component 402 shown external to receiver 88 performs the foregoing mixing and phase inverting function where the receiver circuit lacks such a circuit or a suitable substitute. Other types of matrixing circuits for deriving a G−Y signal are known in the art.

It has been found however that unmodified X and Z matrixing of the reproduced Y—R and Y—B signals as indicated in FIGS. 4*a* and 4*b* gives excellent results, particularly when color controls corresponding to the variable resistor R10 in amplifier component 74, FIG. 4*a*, are used. The arrangement shown in detail in FIGS. 4*a* and 4*b* is simple and economical since it requires no power amplifiers other than those already in the commercial color television receiver. Excellent color rendition is obtained especially of orange-pink skin tones which are ordinarily difficult to reproduce even on direct broadcast reception.

In the specific circuit illustrated in FIGS. 4*a* and 4*b*, the principal color controls are variable resistors in the emitter circuits of the third transistor stage of the playback preamplifiers 75 and 76, the variable resistors corresponding to the variable resistor R10 of the playback circuit 74. These two principal color controls are preferably ganged on concentric shafts which are frictionally engaged with each other so that the gains of the color amplifiers 75 and 76 increase and decrease together as the knob assembly is turned; yet either of the concentric knobs may be turned individually by holding the other one back. These two controls are sufficient to change the picture from normal coloring to exaggerated color intensity, or to a light tint, or even to a monochrome rendition, according to taste. Alternatively, only the amplifier 75 may be provided with a variable resistor having a manual control knob on the user's external panel, the resistor corresponding to R10 of the amplifier 76 either having a preset value or being a fixed resistor of desired value.

Additional control of the color image during playback of a recorded tape is effected by adjustment of resistor R37 and resistor R40, FIG. 4*b*, which are used to set the background color. While these resistors may also be controlled from manual knobs on the operator's external panel they are not used as often once they have been set. The operation of the illustrated system is therefor simplified by placing the operating controls for resistors R37 and R40 at the side or in the back of the assembly rather thatn at the operator's panel. Alternatively resistors R37 and R40 may be replaced by fixed resistors having values of about 2,000 to 20,000 ohms depending on the design of the television receiver circuitry and the associated wiring.

The lower value of bias frequency of approximately 2.7 megacycles per second described herein which is in the frequency range of the video signals supplied to the receiver circuitry 88 had previously been considered to be too low to be operative; a bias frequency of 4 to 5 times the upper limit of the recording range being ordinarily considered optimum; or in any event it was considered that the bias frequency should be well above the upper limit of the recording range. It has been found, however, that a bias frequency of approximately 2.7 megacycles per second allows the use of high frequency bias with heads that would be unuseable at higher bias frequencies because of excessive losses and head saturation. This relatively lower bias frequency also allows the use of high frequency bias where bias of adequate amplitude would be impossible at higher bias frequencies. With the use of bias signal isolation means (such as wave traps 44–46) the relatively lower bias frequency of approximately 2.7 megacycles per second is useable without appreciable interference with the television circuits.

Modifications and Variations of FIGS. 1–8 As Described in application Ser. No. 62,601, now U.S. Pat. No. 3,683,107.

While for illustrative purposes, cross field conductors 30–32 have been illustrated as making a single turn about the poles of the respective head units, it is considered preferable to form the cross field conductors of a thin flat ribbon of conductive material arranged substantially as indicated at 30 in FIGS. 5 and 6 but preferably forming a plurality of turns about the head core rather than a single turn as specifically shown in FIGS. 5 and 6. It will, of course, be understood that the successive turns of the ribbon conductive material are suitably insulated. An example of a winding configuration would be one where one end of the conductive ribbon engages and is secured to the conductor 115, FIG. 5, the ribbon with its insulation following the path 30*a*, 30*c*, 30*b*, but extending from 30*b* inside of conductor 116 and about the outside of conductor 115 so that a desired number of turns may be made with the opposite end portion of the conductive ribbon then more nearly following the path indicated in dash outline at 30*b* so as to make contact with the other conductor 116. The appearance of the ribbon cross field conductor winding in side elevation would essentially conform with that illustrated in FIG. 6 with the upper edge of the successive turns of the ribbon at 30*a* and 30*b* conforming with the tape path at the regions of the tape path (termed the recording regions) where effective recording takes place in each direction of movement of the tape 104. While with a single turn winding such as specifically indicated at 30 in FIG. 5, the bias frequency current might have a r.m.s. amplitude in the range from 1 to 5 amperes at a frequency in the range from 4.2 megacycles per second to 4.4 megacycles per second, for example, where 5 turns of the cross field conductor are employed, the bias frequency current would be reduced correspondingly to 1/5 the previous range of values. The proper bias current will, of course, depend upon a number of factors, so that the examples given herein are simply to indicate the order of magnitude for a particular head configuration and other selected operating conditions.

In the various embodiments, as an alternative, the horizontal and/or vertical synchronizing pulses may be recorded on a separate channel of the record medium from those scanned by the video head units receiving the various color television signal components, in demodulated form or expressed as amplitude or frequency modulated waves.

It will be apparent that in each of the embodiments the color television signal components may take various form other than —Y, X and Z such as for example Y, I and Q; R, G and B; —Y, (R—Y); and (B—Y); —Y, (G—Y) and (B—Y); etc. Also for economy a two-color system might be recorded as —Y and (R—Y) only; or preferably —Y and I only; etc. For the two-color system, the Z or the B—Y components in the illustrated examples would be omitted. Such a two-color system is attractive from the standpoint of enabling use of an economical amateur color camera, which would supply only the —Y and one chroma signal preferably along or near the orange-red and cyan axis. The recorder could still be used for the —Y and both chroma components on broadcast TV signals, or with a more expensive camera.

It may be desired to use the video recorders described here with an ordinary TV set without any internal connections to the set.

Playback of a recorded tape can be effected by feeding the outputs from 84, 75, and 76 in FIG. 2 to modulators which operate on a signal generator having a carrier frequency tuned to a TV channel that is not broadcast in that region, for example channel 6 in the Chicago area. For example with the NTSC system, the outputs of 75 and 76 would quadrature modulate 3.58 mc in a suppressed carrier system, giving sidebands ranging from about 3.08 to 4.08 mc. These are combined with the signal from 84, a burst keyer sound carrier etc. to modulate the TV carrier with a signal that can be handled by an NTSC receiver, and the resultant output is connected to the TV set antenna terminals and tuned in on channel 6 just as with a broadcast station. Very low power is required, so that small transistor circuits can be used, and these can be further simplified by the fact that the signal is not actually broadcast, so that double sideband modulation and other departures are possible. High drive stability can be obtained from s system such as in our Ser. No. 465,192, or a variable delay line can be used to compensate for speed variations.

Recording may be done by building into the recorder RF, IF and video circuitry similar to that found in a color TV set, and feeding these into 14, 15 and 16 of FIG. 1. The IF and RF portions may be eliminated if it is allowable to place a capacitive pickup near the IF output circuits of the TV set; a suitable pickup being a cap or ring placed on the final IF amplifier.

Any of the embodiments described herein may utilize transversely moving heads or other area scanning recording and playback systems. Where multiple head units are required, in a rotating head arrangement the head units are mounted parallel to each other on the rotating mechanism and connected to the stationary circuits through slip rings, rotary transformers, or the like.

In one arrangement for the components of FIG. 4*a* and 4*b*, the tape deck would be housed with the playback amplifiers 74–76 and the circuitry within the box 250 of FIG. 4*a*. The cable 256 would be secured to this tape deck cabinet and would have a plug for detachably coupling these components with the adaptor circuitry 255 which would be associated in the cabinet with the television receiver. Thus the socket associated with the adaptor circuit 255 would be carried by the cabinet for the television receiver. The operating panel with the pushbutton controls for the tape transport would also include preferably the two coaxial frictionally coupled manual controls controlling the variable resistors corresponding to R10 for amplifiers 75 and 76. The tape deck panel would also include a manual control for actuating switch 330 to place the circuitry selectively in playback or record mode. The relay 325 controlled by switch 330 would, of course, be associated with the television set cabinet. The controls for variable resistors R37 and R40 would be at the back side of the tape deck cabinet, for example. The manual control operating the ganged switches 391–395, FIGS. 1 and 2, would be on the user's panel of the tape deck with the other controls just described.

It may be noted that high frequency bias frequencies as low as 1.7 megacycles per second have been utilized with video recording heads for recording television bandwidth signals. It may be noted that the signals reproduced from the magnetic tape as taught in any of the embodiments of the present invention herein disclosed may thereafter be converted to standard broadcast NTSC signals either for broadcast or for transmission over a closed circuit system to remote color television receiving sets.

With the values given herein the color preamplifiers 75 and 76 are provided with a reduced response to the high frequencies at the upper end of the response bandwidth as compared to the response of the monochrome preamplifier 74 to such high frequencies.

With the high resonance and low resonance head windings such as indicated at 24 and 64 connected in series aiding, each winding has a different frequency of peak output. By proper selection of the value of resistive loading of the windings, the induced voltage at least in the low resonance winding does not reverse in phase with respect to the recorded flux except at a single crossover frequency in the overall frequency range.

The resistive loading may be such that the net voltage output from the combined windings reverses in phase at only one point, called the crossover frequency, in the overall frequency range of the playback system. The input circuits of the preamplifiers 74–76 connected to the head units advantageously may provide the desired resistive loading.

The −Y playback amplifier FIG. 4*a* with R10 = 22 has typically a maximum gain of about 3,000 at a frequency of 600 cycles, with a rounded peak falling to a gain of 500 at about 100 cycles and at about 4 kc. It continues to drop as the frequency is raised above 4 kc., to a broad valley of gain equal to about 200 in the region from 10 kc. to 300 kc., then rises with increasing rapidity to about 1,000 or more gain at 1.5 mc. The $R_6$ $L_8$ $C_{39}$ network gives a broad rise of about 2 db. centered at a 65 kc. frequency, and compensates for a wavelength-associated dip in head response at this frequency. The overall response to transients and square waves is almost perfect in the 7 kc. to 100 kc. range.

The response of the X and Z preamplifiers represented by FIG. 4*a* with the indicated modifications is similar to that of −Y except that the response at frequencies above 500 kc is lower by about 6 decibels or more. As the resistance corresponding to R10 for the X and Z preamplifiers is varied from 0 to 50 ohms the gain in the plateau region from 10 kc to 300 kc varies from the 2,000 down to about 120 (being about 250 when R10 is 20 ohms).

The response of all the preamplifiers falls at a rate which exceeds 6 decibels per octave in the region between 1 kc and 10kc; and particularly the −Y amplifier rises at a rate exceeding 6 decibels per octave in the vicinity of a megacycle. These rates are responsible for the excellent overall transient response of the system.

It will be apparent that many modifications and variations may be effected without departing from the scope of the novel concepts of the present invention.

Description of FIGS. 10–13

The following description corresponds to that found at pages 30–50, 51–52, 62–63, 65–77, 81 of my application Ser. No. 848,992 which is a division of Ser. No. 401,832 filed Oct. 6, 1964, now U.S. Pat. No. 3,495,046.

As shown in FIG. 10, the magnetic record medium 1011 is moved across the transducer head, which is represented by the video magnetic core 400 and which has mounted thereon a pair of video coils 401 and 402. The record and playback circuit of FIG. 10 is utilized with a commercially available television receiver indicated at 404.

Referring to FIG. 10, record-playback selector switches 405, 406 and 407 are shown in the playback position so as to connect the coils 401 and 402 in the series. With the switches 405–407 in the playback position, the coil 401 is shunted by a resistor 410, while the coil 402 is shunted by a resistor 411. Resistors 410 and 411 are connected across the coils 401 and 402 respectively to suppress undesirable "ringing" or resonance oscillations which may occur in the coils during the playback operation. When the switches 405–407 are placed in the record position, the coil 402 has a resistor 412 connected thereacross by switch 407 through line 414 and 415, and only the coil 401 is energized through the line 414 from the television receiver of 404. Alternatively, coil 402 may be short circuited during recording.

A video amplifier tube 416 of the television receiver 404 has the output signals thereof connected to the record terminal of a selector switch 418 through a capacitor 419. The signal from the tube 416 is applied to a parallel network comprising capacitor 420 and resistor 421 through a line 422 during the record operation of the system.

A high frequency bias signal is applied to the primary winding **425*a* of a transformer 425 from a high frequency oscillator 426. A capacitor 423 is connected across the primary winding 425*a*. The oscillator 426 is energized when a selector switch 427 is placed in the record position, to supply the necessary direct current operating voltage to the high frequency oscillator 426. The secondary 425*b* of transformer 425 is connected to a cross field conductor 429 of head 400. Also during the record operation of the tape recording system, a switch contact 428 is connected to a line 430 in the television receiver 404 to supply the usual composite video signal to the tube 416 from the broadcast receiving circuits of receiver 404.**

To facilitate construction of the tape recording system of the present invention, an adaptor box 433 is provided for connection to the television receiver 404 preferably as a plug-in unit although the components within box 433 may alternatively be individually wired into the circuit of set 404. Plug-in connections are diagrammatically indicated at 435–439.

During the playback operation of the system, all the selector switches 405–407, 418, 427 and 428 are placed in the playback position indicated by the letter P in FIG. 10. This action will remove the high frequency bias from the transformer 425 and will also prevent the television receiver 404 from receiving any intelligence signal other than that from the record medium 11.

As the record medium 11 moves over the transducer head 400 during a playback, the video and synchronizing intelligence from the coils 401 and 402 is applied through a line 441 and a capacitor 442 to a base electrode of the transistor 443, which is the first stage of amplification of the wide band amplifier shown in FIG. 10. A low direct current supply voltage is developed at circuit points 445 by means of a voltage divider 469, 471 in conjunction with a filter capacitor 472. This voltage is applied to the base electrode of the transistor 443 from a voltage divider network comprising resistors 448 and 449 via a resistor 450. The low supply voltage at circuit point 445 is also applied to the collector electrode of the transistor 443 through a compensating circuit 452 which comprises a parallel network consisting of a resistor 454 and a capacitor 455 connected in series with a resistor 457 and an inductor 458.

A biasing resistor 460 an a feedback capacitor 461 are connected to the emitter electrode of the transistor 443 to provide the necessary operating bias. The output of transistor 443 is then applied to the grid electrode of a pentode tube 464 through a capacitor 465 and an inductor 466.

A grid return resistor 468 is connected between the grid electrode of the tube 464 and ground. The screen grid of the pentode 464 is supplied with positive voltage by virtue of the connection of a resistor 473 between the screen grid circuit and power supply terminal 475′. The pentode 464 is biased by a cathode resistor 474. A capacitor 475 shunting resistor 474 is shown in dotted outline since it may be omitted from the circuit with some reduction in gain, or a small value of capacitance (about 0.001 microfarads) may be used for high frequency emphasis while accepting reduced gain at lower frequencies. A direct current supply voltage for the tube and transistor circuits is obtained from a terminal 475′. The terminal 475′ is connected to the plate electrode of tube 464 through a compensating circuit 476 consisting of an inductor 478, a series resistor 479 and a parallel network including a resistor 481 and a capacitor 482.

The output of the second stage of amplification is then applied through a parallel network consisting of an inductor 483 and a resistor 484 and therefrom through a capacitor 485 to the control grid electrode of a pentode 487. The parallel network consisting of inductor 483 and resistor 484 comprise a compensating or correcting circuit. Connected between the control electrode of pentode 487 and ground is a grid return resistor 488. In the cathode circuit of pentode tube 487 is a variable biasing resistor 490 which serves as a gain control for the output of the amplifier circuit shown in FIG. 10. Shunting the variable resistor 490 is a capacitor 491, which may be omitted entirely with some reduction of gain, or a small capacitance may be used for high frequency emphasis. The screen grid electrode of pentode 487 is also connected to the resistor 469. A capacitor 492 is connected between the screen grid electrodes of pentodes 464 and 487 and ground for bypassing the screen grid electrodes. The supply voltage is applied to the plate electrode of pentode 487 through a compensating circuit 493 comprising an inductor 494, a series resistor 495 and a parallel network consisting of a capacitor 496 and a resistor 497. Both the pentodes 464 and 487 have their suppressor grid electrodes connected directly to their respective cathode electrodes as shown in FIG. 10.

The output from the third and final stage of amplification of the amplifier shown in FIG. 10 is applied to the television receiver 404 through a capacitor 498, an inductor L2 (not shown) and a conductor **500*a* of cable 500. Connected between capacitor 498 and inductor L2 is a clamping network 502 including a series diode 503 connected to a parallel circuit including a resistor 505 and a capacitor 506, and a diode 507 connected in series to a resistor 508 which, in turn, is connected to a winding 510 on the flyback transformer 511 of television receiver 404**.

To minimize the effects of stray signals in the amplifier circuit, the chassis of the television receiver 404 is connected to the chassis of the amplifier circuit through a conductor 500*b* of the cable 500. The amplified signal from the last stage of amplification is applied to the control grid of tube 416 of the television set 404 through a parallel network consisting of a resistor 515 and an inductor 516 when switch 428 is in the playback position.

In the preferred embodiment of amplifier circuit described hereinabove, the component values are as follows:

| COMPONENTS | | COMPONENT VALUE | |
|---|---|---|---|
| Capacitor | 442 | 0.15 | microfarad |
| do. | 461 | 50 | microfarads |
| do. | 455 | .01 | microfarad |
| do. | 465 | .01 | microfarad |
| do. | 475 | .001 | do. |
| do. | 485 | .005 | do. |
| do. | 492 | 10 | microfarads |
| do. | 491 | .001 | microfarad |
| do. | 498 | .002 | do. |
| do. | 496 | .05 | do. |
| do. | 506 | .05 | do. |
| do. | 419 | 1 | do. |
| do. | 420 | 85 | micromicrofarads |
| do. | 472 | 50 | microfarads |
| Resistor | 412 | 22,000 ohms | |
| do. | 410 | 3,300 ohms | |
| do. | 411 | 33 K ohms | |
| do. | 421 | 22 K ohms | |
| do. | 450 | 10 K ohms | |
| do. | 449 | 10 K ohms | |
| do. | 448 | 150 K ohms | |
| do. | 460 | 1 K ohm | |
| do. | 457 | 200 ohms | |
| do. | 454 | 18 K ohms | |
| Resistor | 468 | 150 K ohms | |
| do. | 474 | 68 ohms | |
| do. | 469 | 47 K ohms | |
| do. | 471 | 65 K ohms | |
| do. | 479 | 5,200 ohms | |
| do. | 488 | 150 K ohms | |
| Variable Resistor | 490 | 50 to 250 ohms | |
| Resistor | 495 | 1.5 K ohms | |
| do. | 497 | 10 K ohms | |
| do. | 508 | 10 K ohms | |
| do. | 505 | 470 K ohms | |
| do. | 515 | 10 K ohms | |
| Inductor | 458 | 100 | microhenries |
| do. | 466 | 250 | do. |
| do. | 478 | 100 | do. |
| do. | 483 | 250 | do. |
| do. | 494 | 100 | do. |
| do. | L2 | 250 | do. |
| do. | 516 | 250 | do. |
| Transistor | 443 | Type 2 N 708 | |
| Tube | 464 | Pentode 6 GM6 | |
| Tube | 487 | Pentode 6 GM6 | |
| Diode | 503 | 1N34A | |
| Diode | 507 | 1N34A | |

B+(Voltage applied at terminal 475') equals about 250 volts d.c.

An alternate embodiment of recording and playback circuitry is shown in FIG. 11. FIG. 11 is primarily concerned with transducing video intelligence and synchronizing signals and therefore the audio portion of the transducer head is not shown.

As shown in FIG. 11, the magnetic record medium 11 is moved across a transducer head, which is represented by a video magnetic core 550 having mounted thereon a coil 551 and a coil 552. During recording a commercially available television receiver 554 is used to supply video intelligence and synchronizing signals to the coils 551 and 552. The signal from television receiver 554 is applied to the head via a line 553 a secondary winding 555 of a transformer 556, and a parallel network consisting of resistor 558 and capacitor 559. A variable capacitor 560 and an inductor 561 in series are connected between line 553 and ground. A resistor 562 is connected between the lower terminal of coil 552 and ground. Record playback selector switches 566 and 567 are connected to coils 551 and 552 for selecting different operating conditions during recording and playback.

A high frequency bias oscillator 568 has the output thereof applied to the primary winding 569 of the transformer 556. A portion of the high frequency energy applied to transformer 556 is coupled to a biasing coil 570 on the video magnetic core 550 from a secondary winding 571 on the transformer 556. Operating voltage is applied to the high frequency bias oscillator 568 through a record playback selector switch 574.

In the playback mode of the circuit shown in FIG. 11, video intelligence and synchronizing signals from the coils 551 and 552 are applied through a line 576 and capacitor 578 to the base electrode of a transistor 577, which is the first stage of a wide band video amplifier. A low direct current supply voltage is applied to a line 579 and a portion of the supply voltage is applied to the base electrode of the transistor 577 through a network comprising resistors 580, 581 and 582. The low supply voltage from line 579 is also applied to the collector electrode of transistor 577 through a compensating circuit 585 which comprises a parallel network consisting of a resistor 586 and a capacitor 587 and a series circuit consisting of a resistor 589 and an inductor 590.

The output of transistor 577 is applied to the control grid of a pentode tube 592 by means of a coupling capacitor 593 and a compensating network consisting of a resistor 595 and a capacitor 596 in parallel and a circuit 599 which comprises an inductor 601, a resistor 602, and a resistor 604 and a capacitor 605 in parallel. The screen grid of tube 592 is connected to resistors 607 and 608 and to a resistor 609. A capacitor 611 is connected across the resistor 608 to ground potential for removing any unwanted high frequency components from the line 579, while a capacitor 613 is connected between a line 614 and ground potential for bypassing the screen grid of tube 592. A biasing network comprising a resistor 615 and a capacitor 616 in parallel is connected to the cathode circuit of tube 592. The pentode tube 592 has the screen suppressor grid thereof connected directly to the cathode electrode as shown in FIG. 11.

A direct current supply voltage is applied to a terminal point 620 and therefrom to a compensating circuit 621 through a resistor 622. Connected to a point intermediate the compensating circuit 621 and resistor 622 is a capacitor 625 for shunting alternating current signals to ground which might otherwise be impressed on the supply voltage source. Compensating circuit 621 comprises a parallel network consisting of a resistor 626 and a capacitor 627 which is connected to a series network consisting of a resistor 628 and an inductor 629.

The output from the second stage of amplification is then applied through a coupling capacitor 631 and an inductor 632 to the control electrode of a pentode 635. Connected between the coupling capacitor 631 and ground potential is a resistor 636. Connected to the cathode circuit of tube 635 is a biasing network consisting of a resistor 638 and a bypass capacitor 639. The substantially reduced direct current potential on line 614 is applied to the screen grid to tube 635 through a line 640, while the suppressor grid of tube 635 is connected directly to the cathode electrode as shown in FIG. 11.

The output from the third and final stage of amplification of the video amplifier shown in FIG. 11 is applied to a compensating circuit 642 comprising a parallel network consisting of a resistor 643 and a capacitor 644 and a series network consisting of a resistor 646 and an inductor 647. The output signal from tube 635 which has been developed across the compensating network 642 is propagated through a coupling capacitor 650 to a clamping circuit 652, which clamps the amplified video signal at a predetermined level for optimum operation of the television receiver 554. The clamping circuit 652 comprises a resistor 653, a capacitor 654, an inductor 655 and a diode 656. The substantially reduced supply voltage from line 614 is applied to the clamping circuit 652 through a resistor 657. The output signal from clamping circuit 652 is applied to the control grid of a video amplifier 660 of the television receiver 554 via a coupling capacitor 661, a line 662, selector switch 663 and a control grid resistor 664. Also connected to the resistor 664 is a capacitor 666 and a resistor 667. The resistor 653 may be a variable resistor to provide a suitable video gain control. However, if automatic video gain control is desired, the automatic gain control voltage from the television receiver 554 can be applied to the grid of tube 635 through resistor 636.

As is shown in FIG. 11, when the tape recording system is in the record position a selector switch 668 is connected to the plate electrode of tube 660 through a coupling capacitor 669, thereby applying video and synchronizing signals to the winding 551 through the transformer secondary winding 555. Also applied to the winding 551 is a high frequency bias signal from secondary winding 555 which cooperates with the high frequency biasing signal from transformer coil 571 in producing an effective bias field.

In the alternate embodiment of the amplifier circuit shown in FIG. 11 as described hereinabove, the component values are preferably as follows:

| COMPONENT | | COMPONENT VALUE | |
|---|---|---|---|
| Capacitor | 559 | 85 | micromicrofarads |
| do. | 578 | 0.15 | microfarads |
| do. | 584 | 50 | do. |
| do. | 587 | .02 | do. |
| do. | 593 | .047 | do. |
| do. | 596 | 50 | micromicrofarads |
| do. | 605 | .003 | microfarads |
| do. | 616 | 100 | do. |
| do. | 611 | 50 | microfarads |
| do. | 627 | .05 | microfarads |
| do. | 631 | .01 | do. |
| do. | 613 | 10 | do. |
| do. | 639 | 100 | do. |
| do. | 625 | 8 | do. |
| do. | 650 | .05 | do. |
| do. | 644 | 0.1 | do. |
| do. | 654 | 50 | do. |
| do. | 661 | .25 | do. |
| do. | 669 | 4 | do. |
| do. | 560 | 5 micromicrofarads – 80 | micromicrofarads |
| Resistor | 562 | 24 | K ohms |
| do. | 581 | 10 | K ohms |
| do. | 582 | 10 | K ohms |
| do. | 580 | 150 | K ohms |
| do. | 583 | 1 | K ohms |
| do. | 586 | 18 | K ohms |
| do. | 589 | 3.3 | K ohms |
| do. | 595 | 12 | K ohms |
| do. | 602 | 270 | ohms |
| do. | 604 | 47 | K ohms |
| do. | 615 | 68 | ohms |
| do. | 607 | 47 | K ohms |
| do. | 608 | 65 | K ohms |
| do. | 609 | 22 | K ohms |
| do. | 628 | 4.7 | K ohms |
| do. | 636 | 150 | K ohms |
| do. | 638 | 60 | ohms |
| do. | 600 | 4.7 | K ohms |
| do. | 626 | 7.5 | K ohms |
| do. | 622 | 1 | K ohm |
| do. | 646 | 3 | K ohms |
| do. | 643 | 5 | K ohms |
| do. | 657 | 300 | K ohms |
| do. | 653 | 0–150 | K ohms |
| do. | 558 | 22 | K ohms |
| do. | 665 | 470 | K ohms |
| 5 Inductor | 590 | 250 | microhenries |
| do. | 601 | 250 | microhenries |
| do. | 629 | 250 | microhenries |
| do. | 632 | 500 | microhenries |
| do. | 647 | 100 | microhenries |
| do. | 655 | 250 | microhenries |
| do. | 561 | 250 | microhenries |
| Transistor | 577 | 2N708 | |
| Tube | 592 | Pentode 6GM6 or 6CB6A | |
| Tube | 635 | Pentode 6GM6 | |

For optimum operation of the television receiver used with the tape recording system of the present invention, a synchronizing signal of sufficient amplitude and of proper phase is necessary to provide a uniform horizontal sweep signal for the deflection system. By way of example, and not by way of limitation, FIG. 12 shows a preferred modification of the horizontal control circuit of a Zenith television receiver Model No. 14L30 for the purposes of the present invention. Horizontal synchronizing pulses from a sync-pulse separator of the television receiver are applied to a line 700. These sync-pulses may have an amplitude of 50 volts negative. A record-playback selector switch 701 has one stationary contact thereof connected to the control grid of a triode tube section 703. The triode tube section 703 forms a part of the horizontal sweep oscillator circuit used in the television receiver. During playback operation, the negative horizontal synchronizing pulses on line 700 are applied to the control grid of tube section 703 through a capacitor 705, a resistor 706 and the selector switch 701 as indicated in FIG. 12. However, when the movable contactor of selector switch 701 is in the record position, the horizontal control circuit of FIG. 12 operates under relatively normal conditions to synchronize the horizontal sweep oscillator of the television receiver by means of broadcast signals received from a television transmitting station.

During playback operation of the system, the negative synchronizing signal from the sync-separator is also applied to a phase detector 708, comprising a pair of end-to-end diodes 710 and 711, a pair of resistors 713 and 714, and a capacitor 715. An input capacitor 716 is connected between the line 700 and a terminal point 717, and capacitors 718 and 719 are connected between the anodes of the respective diodes 710 and 711 and ground potential.

The diodes 710 and 711 are preferably of a configuration used by certain manufacturers of television receivers, that is, two diodes in a single container having their cathodes connected together and a lead connected intermediate the cathodes to provide a single encapsulated unit having three leads extending therefrom. The symbol used in FIG. 12 represents such a three terminal unit. However, it can be seen that two individual diodes can be used in the horizontal control circuit of FIG. 12 by connecting their cathodes together and to terminal point 717.

To increase the speed of response of the horizontal control circuit, a capacitor 721 is connected in the circuit and has one end thereof connected to the switch 701 and the other end thereof connected to the output of the phase detector 708 at a terminal point 722. The capacitor 721 is shunted by a resistor 725 through the selector switch 701, while one end of resistor 725 is connected to ground through a first series network consisting of a resistor 726 and a capacitor 727 and through a second series network consisting of a resistor 728 and a capacitor 729. The tube section 703 has the cathode electrode thereof connected to ground potential while the plate electrode thereof is connected to a direct current supply potential through a plate load resistor 730.

The output of tube section 703 is applied to the control grid of a pentode tube section 733 through a pair of capacitors 734 and 735. The tube section 733 forms the other part of the horizontal sweep oscillator of FIG. 12. A portion of the direct current bias developed on the grid of the pentode 733 is fed back to a terminal point intermediate resistor 726 and capacitor 727 through a resistor 737. From a point intermediate capacitors 734 and 735 the output signal of tube 703 is also applied to a tuned circuit 738 consisting of a capacitor 740 and an inductor 741. The tuned circuit 738 is also connected to the grid electrode of pentode 733 through a resistor 743. The cathode of pentode 733 is connected to ground potential through a portion of inductor 741, which is defined by a tap 745, thereby providing the necessary feedback to the tuned circuit to sustain oscillation thereof. The screen grid electrode of pentode 733 is connected to a positive voltage which is somewhat less than the positive voltage applied to the plate electrode of the same tube. The plate electrode of the oscillator tube section 733 is connected to a voltage source, one having a potential of about 600 volts DC, through a plate load resistor 747. A wave form shaping circuit consisting of the resistor 747, a capacitor 748 and a registor 749 forms a sawtooth wave for driving the horizontal output tube to which the circuit is coupled by means of capacitor 751.

Indicated at 753 is a portion of a flyback transformer incorporated in the horizontal deflection system of the television receiver. Highly positive pulses of approximately 300 volts are generated at winding **753*a* of the flyback transformer 753. Winding 753*a* is connected to a terminal point 754 of the phase detector 708 through a line 755 and a parallel network consisting of a capacitor 756 and a resistor 757.**

The operation of the horizontal control circuit of Figure 12 when the selector switch 701 is in the record position is virtually unchanged from that which the manufacturer had intended for receiving television signals which have been transmitted by a television transmitting station. However, when the selector switch 701 is in the playback position, as shown in Figure 12, the speed of response of the horizontal control circuit is greatly increased to enable compensation for any high speed flutter in the motion of the record medium. The positive 300 volt pulses from flyback transformer 753 represents the horizontal oscillator sweep frequency and this is compared by the phase detector 708 with a synchronizing pulse applied to the phase detector from line 700. If the horizontal sweep oscillator of Figure 12 tends to run too fast, the phase comparison circuit 708 causes the control grid of tube segment 703 to become more positive which, in turn, increases the effectiveness of capacitor 734, which is shunted across the oscillator tuning capacitor 740 through the plate to cathode circuit of tube segment 703. The increased tuning capacity tends to decrease the oscillator frequency in a corrective manner to the synchronizing frequency of the horizontal synchronizing pulses applied to line 700.

To provide proper compensation for flutter in the tape recording system, the capacitor 721 and resistor 728 are incorporated. These components enable the grid electrode of tube segment 703 to sense the effect of phase errors between the 300 volt pulses from the flyback transformer 753 and the 50 volt negative pulses from the sync-separator circuit almost immediately. To further increase the speed of response to phase errors, it is preferable that the capacitor 705 and resistor 706 be connected between the line 700 and the grid electrode of tube segment 703 for superimposing a direct trigger pulse through the horizontal control tube 703 and therefrom to the grid electrode of horizontal oscillator tube section 733. A change in phase of the pulse from phase detector 708 will immediately affect the discharge point of the horizontal oscillator to give a higher speed correction of flutter in the tape recording system. For optimum stability of horizontal control circuit in Figure 12 the ratio (R1/R2) should preferably equal the ratio (C2/C1), where $R_1$ and $R_2$ refer to the resistance values of resistors 706 and 728 and C1 and C2 refer to the capacitance values of capicitors 705 and 729.

The horizontal control circuit of Figure 12 has great economy since only two resistors and two capacitors are required to modify the original horizontal control circuit of the television receiver. The added resistors are resistor 706 and resistor 728, while the added capacitors are capacitor 705 and capacitor 729. In some instances, it may be desirable to reduce the values of capacitors 718 and 719 to further increase the speed of response of the horizontal control circuit.

In the horizontal control circuit of Figure 12 the component values are preferably as follows:

| COMPONENTS | | COMPONENT VALUES |
|---|---|---|
| Capacitor | 705 | 100 micromicrofarads |
| Capacitor | 715 | 51 micromicrofarads |
| Capacitor | 716 | 51 micromicrofarads |
| Capacitor | 718 | 390 micromicrofarads |
| Capacitor | 719 | 390 micromicrofarads |
| Capacitor | 721 | 200 micromicrofarads |
| Capacitor | 727 | .047 microfarads |
| Capacitor | 729 | 470 micromicrofarads |
| Capacitor | 734 | 1000 micromicrofarads |
| Capacitor | 735 | 470 micromicrofarads |
| Capacitor | 740 | 3300 micromicrofarads |
| Capacitor | 748 | .005 microfarads |
| Capacitor | 751 | .005 microfarads |
| Capacitor | 756 | 4.7 micromicrofarads |
| Resistor | 713 | 330 K ohms |
| Resistor | 714 | 330 K ohms |
| Resistor | 706 | 750 K ohms |
| Resistor | 725 | 1 megohm |
| Resistor | 726 | 150 K ohms |
| Resistor | 728 | 150 K ohms |
| Resistor | 743 | 100 K ohms |
| Resistor | 730 | 68 K ohms |
| Resistor | 737 | 10 megohms |
| Resistor | 747 | 120 K ohms |
| Resistor | 749 | 12 K ohms |
| Resistor | 757 | 150 K ohms |
| Tube segments | 703 and 733 | Type 6 KD8 |

Still another method of reducing the effects of flutter in the tape recording system of the present invention is shown in Figure 13. Here a compensating signal is applied to the beam deflection circuit of the television receiver for correcting the beam deflection signal. Negative horizontal synchronizing pulses are applied to the horizontal deflection circuit of Figure 13 through a line 800 and therefrom to a balanced phase detector 801 through a capacitor 802. The balanced phase detector 801 consists of a pair of end-to-end diodes 805 and 806, a pair of resistors 807 and 808 shunting the diodes 805 and 806 respectively, a capacitor 809, and a pair of capacitors 811 and 812 connected between the anodes of the respective diodes 805 and 806 and ground potential.

The output of phase detector 801 is applied to the control grid of a tube 815 through a variable resistor 816. Connected to one end of variable resistor 816 is a resistor 817 which is connected to a negative bias supply. The variable resistor 816 and resistor 817 form a voltage divider network which provides the necessary width control of the horizontal sweep signal from tube 815. A filter capacitor 819 is connected between a point intermediate the variable resistor 816 and fixed resistor 817, and ground potential thereby preventing high frequency signals from appearing across the negative bias supply. The cathode and suppressor grid of tube 815 are connected to ground, as shown in Figure 13, while the screen grid electrode of tube 815 is connected to a positive voltage which is of some potential less than the supply potential applied to the plate of the same tube.

The horizontal sweep signal from the output of tube 815 is applied to a primary winding 821 of an output transformer 822. Connected between the primary winding 821 and supply terminal 824 is a filter capacitor 825 for preventing high frequency signals from appearing across the supply. A secondary winding 827 of the transformer 822 has one end thereof connected to a capacitor 828 while the other end of winding 827 is connected to a high voltage positive supply through terminal 829. Also connected to the terminal point 829 is one end of a flyback transformer 831 and one lead of a capacitor 832, while the other lead of capacitor 832 is connected to capacitor 828 and to the horizontal deflection yoke 835. Connected between a tap 836, of the deflection yoke 835, and one end of the deflection yoke 835 is a capacitor 837. The capacitor 837 and the horizontal deflection yoke 835 are connected to a tap 839 on the flyback transformer 831 through a line 840.

The upper lead of the horizontal flyback transformer 831 is connected to a high voltage rectifier, not shown, the output of which supplies the necessary high voltage for the picture tube of the television receiver. A lead 843 from the flyback transformer 831 is connected to the damper circuit of the television receiver, while a lead 844 of the flyback transformer 831 is connected to the horizontal output circuit of the television receiver.

The signal to be compared with the horizontal synchronizing pulses applied to line 800 is derived from a winding 846 on the flyback transformer 831 and positive pulses therefrom, corresponding to the horizontal oscillator frequency, are applied to the phase comparator circuit 801 through a line 847 and a parallel network 848 consisting of a capacitor 849 and a resistor 850. As the phase comparator 801 senses a difference in phase relationship between the two horizontal rate signals applied thereto, the charge on capacitor 811 will vary thereby changing the bias applied to the grid electrode of tube 815 which, in turn, will vary the amplitude of the compensating signal applied to the output transformer 822.

Although the flutter compensation circuit shown in FIG. 13 is more complex than that shown in FIG. 12, it can be used in television receivers in which flutter compensation such as provided by capacitor 721 in FIG. 12 is impractical. The flutter compensating circuit shown in FIG. 13 is preferably used in addition to a usual horizontal control circuit, or in addition to a modified horizontal control circuit such as illustrated in FIG. 12. Where the control circuit of FIG. 12 is also utilized, the critical resistance and capacitance values for the components of FIG. 13 may be chosen to complement the deficiencies of the other control circuit. For example the circuit of FIG. 13 can respond to the higher range of flutter frequencies above the range that is controlled by the control circuit of FIG. 12. By way of example in the embodiment of FIG. 13, capacitor 832 may have a value of 0.15 microfarads while capacitor 828 may be a 5,000 microfarad low voltage electrolytic capacitor.

In the compensating circuit 452 at the output of transistor 443, FIG. 10, for example, the inductor 458 in conjunction with capacitor 455 is especially selected to provide a phase reversal in curve 680 at the resonance frequency of winding 402 as indicated at 682. The relative values of resistor 457, capacitor 455 and inductor 458 are critical for proper amplitude and phase correction. The resistor 457 and capacitor 455 may be provided with a trimmer adjustment means so as to adjust the frequency and amplitude characteristics at region 682 of curve 680. Also, the inductor 458 may be provided with a trimmer adjustment so as to be adjustable to a precise value giving the optimum changeover frequency in coincidence with the phase shift obtained by the coil 402.

It may be noted, that means for compensating for the phase reversal obtained from the coils such as 401 and 402 may be provided in any one or more of the amplifier stages in the playback amplifier.

To illustrate another means for compensating for phase reversal of signals from the transducer head, the capacitor 596 and resistor 595 in conjunction with inductor 601 and resistor 600, in the input circuit of tube 592, FIG. 11, will control the location of the region 681 of the curve 680.

Referring to FIG. 10, the primary winding 425*a*of transformer 425 is preferably part of the tank circuit of the oscillator 426. The primary winding 425*a*and the capacitor 423 are tuned to resonate at the frequency of operation of the oscillator 426 and are brought close to the head core 400 so that the secondary circuit including secondary winding 425*b*and cross field conductor 429 may have substantially the minimum practical impedance. In other words, the leads connecting the secondary winding 425*b*and the cross field conductor 429 have a minimum length, the long leads being in the primary circuit between the tank circuit and the remainder of the oscillator indicated at 426.

It has been found advantageous, although optional, to connect a capacitor 930 across resistor 411. The capacitor 930 when employed is connected across the winding 402 during playback.

By way of example, capacitor 930 may have a value of 35micro microfarads.

During recording operation, a resistor 412 is connected across the winding 402. Resistor 412 may have a value of 22,000ohms, for example.

In FIG. 10 if the head characteristics are controlled closely taking into account the effect of resistors 410 and 411 and the capacitor 930, if present, the values of capacitor 455, resistor 457 and inductor 458 may be fixed at appropiate values relative to such head characteristics and trimmer components omitted.

The parallel network of inductor 483 and resistor 484 in the circuit of FIG. 10 are preferably selected to provide a high frequency series peaking circuit.

In the circuit of FIG. 10, during playback operation, the output of the playback amplifier is supplied via a capacitor 666 and a resistor 667 to a conventional automatic gain control circuit 933 which may be that of the Zenith 14L30Chassis previously referred to. The plate of the automatic gain control section of the automatic gain control and sync. clip tube of said 14L30 Chassis (Tube 6HS8) may be connected to lead 935 indicated in FIG. 10 which leads to one contact of a switch 937. A capacitor 938 is connected between line 935 and a line 939 of the circuit. When the switch 937 is in its upper position, the lower end of resistor 488 is grounded, while when the switch 937 is in the lower position, the lower end of the resistor 488 is connected to line 935 to receive gain control signals from the automatic gain control circuit 933 of the television set 404.

The clamping circuit of FIG. 10 has the following features:

1. It provides bias for the video amplifier tube 416 of the television set 404.
2. It allows transients in the signal to pass without substantial rectification. Such rectification would cause picture and sync. distortion.
3. The clamping circuit is non-critical as to shift in clamping interval due to flutter in the signal reproduced from the record medium.
4. The circuit operates stably in conjunction with the flutter stabilizing circuit of Figure 12.
5. The circuit uses a minimum of inexpensive parts.
6. The circuit does not require additional transformers, amplifier stages, delay lines, trigger circuits or the like.
7. The clamping circuit does not shift the picture portion of the signal appreciably or require a special setting of the horizontal operator hold control (controlling the inductance of indutor 741, FIG. 12) for playback as compared to normal operation of the television set 404.

The circuit point indicated at 942 in FIG. 10 within the television set 404 is connected with a source of 250 volts d.c. voltage through variable resistor 965 (FIG. 11) which may have a value of about 1 to 5 megohms, 2 120,000 resistor 966, and a 22,000 ohm resistor 967. A further resistor is indicated at 944 in FIG. 10 in shunt with the branches of the clamping circuit 502. Resistor 944 may have a value of 300,000 ohms to provide a net shunting resistance of about 250,000 ohms taking into account the loading of resistor 944 by the components within the television set 404 previously referred to. The value of resistor 944 of 300,000 ohms is selected where capacitor 498 has a value of 0.003 microfarads, inductor 499 has a value L1 of 6.2 millihenries, resistor 505 has a value of 470,000 ohms, capacitor 506 has a value of 0.047 microfarads, resistor 508 has a value of 22,000 ohms and the pulses from the output transformer 511 via winding 510 have peaks of minus 7 volts occurring at the horizontal line rate.

Components 503, 499 and 506 of the first branch of the clamping circuit 502 may be in series in any sequence. Registor 505 may be placed across inductor 499 and capacitor 506 instead of across capacitor 506 only. In the second branch of the clamping circuit components 507 and 508 may be interchanged in position in the circuit. Resistor 505 and capacitor 506 may be omited (shorted out) if a bias voltage is not required for the video amplifier stage 416.

The foregoing examples of specific values of the various components of the clamping circuit and of various rearrangements and modifications are, of course, by way of example only and not by way of limitation.

In operation of the circuit of FIG. 10 in the playback mode, the winding 510 of output transformer 511 of the television set 404 supplies a waveform as indicated at 946. The 7 volt negative peaks of the waveform occur at the line rate and produce a negative current flow through the series circuit including components 508, 507, 499, 503, and component 505 and 506 in parallel. Circuit point 947 in FIG. 10 becomes negatively charged with respect to ground by approximately 2.5 volts. Circuit point 948 is momentarily driven to about minus 2.75 volts due to the negative current pulse through diode 503. Circuit point 947 remains essentially at minus 2.5 volts at all times, while circuit point 948 drops to minus 2.5 volts after the negative current pulse has terminated. The presence of diode 503 clamps circuit point 948 which is directly coupled to the grid of tube 416 in the television set to 2.5 volts negative at the end of the negative actuating pulse of current produced by the peaks of the waveforms 946. The end of each actuating pulse occurs approximately at the end of the horizontal blanking period, after which a positive going picture signal is transmitted through coupling capacitor 498. The picture signal can change the potential of circuit point 948 in a positive direction up to a potential of zero volts at which diode 507 becomes conducting. Similarly the signal is not restricted if it does not swing below minus 2.5 volts. Thus picture signals up to 2.5 volts peak potential can be accomodated. Each horizontal line of the picture signal starts with respect to a minus 2.5 volt reference potential which is established by the clamping circuit at circuit point 948. The bias or reference potential may be made more negative by increasing resistor 505, by decreasing the value of resistor 508, or increasing the amplitude of the pulse voltage waveform 946; and the bias or reference potential may be made less negative by oppositely changing the aforementioned values. The inductance of inductor 499 offers a high impedance to composite signal transients which are present in the type of video system described (due to high frequency emphasis, phase shifts, etc.) thus minimizing rectification by diode 503. Rectification by diode 503 would otherwise cause distortion and sync. shift. The inductance 499 also reduces clipping of the sync. peak amplitudes when the clamping circuit 502 is actuated at time intervals corresponding to the back porch of the video waveform.

A resistor for example having a value of 5,000 ohms may be used in place of inductor 499, but the inductor has been found to give better results. Resistor 508 has an effect for positive peaks of the composite video signal similar to that provided by inductor 499.

The resistor 944 together with the parallel resistance of the television circuit 404 discharges coupling capacitor 498 to some extent during the line scan interval. A time constant of about 750 microseconds for capacitor 498 and its discharge resistance including resistor 944 is a good compromise, (corresponding to the product of 250,000 ohms and 0.003 microfarads), with a range from 200 to 2,000 microseconds being practical. The discharge circuit provided by the resistance including resistor 944 reduces low frequency noise, shades the picture and has been found to reduce distortion and sync. shift.

The degree of clamping action may be increased by reducing the value of resistor 508 or by increasing the pulse peaks of waveform 946, the value of resistor 505 being reduced correspondingly to maintain the specified bias.

The proportions set forth in the above example have been found advantageous, since too strong a clamping action may affect the sync. adversely by suppressing the vertical sync. for example.

The clamping circuit of FIG. 10 may be inverted and positive pulses supplied by means of a winding such as 510 if clamping of a negative going picture signal is desired.

The resistor 412 which may have a value of about 22,000 ohms is shown as an alternative to short circuiting the winding 402 which has the relatively large number of turns, during the recording operation.

Referring to FIG. 10, and particularly to the television circuit 404 utilized during recording operation, it will be observed that resistor 664 associated with the grid of tube 416 is connected with certain components of the television circuit only when the selector switch 428 is in the record position. These components associated with line 430 have been indicated as comprising the detector circuit 950 which is a standard part of chassis 14L30 and has its input 951 connected to the third I.F. stage of Chassis 14L30. Line 430 is also connected to component 953, 954 and 955 of Chassis 14L30. In Chassis 14L30, resistor 953 has a value of 1,500 ohms and resistor 955 has a maximum value of 2,500 ohms. The television set is in condition for normal operation whenever switch 428 is in the record position, whether or not switch 418 is also actuated to record position. A broadcast television signal may be viewed on the television set 424 whenever switch 428 is in the record position, and the received broadcast signal may be simultaneously recorded on the record medium 11 when switch 418 is in the record position also.

In Chassis 14L30 output line 958 of the video amplifier 416 is connected to the cathode ray tube of the set 404 without further amplification stages.

Referring to FIG. 10, the tank circuit comprising capacitor 423 and transformer 425 may be tuned to the bias frequency which, for example may be 2.75 megacycles per second.

Referring to FIG. 10, resistor 481 may typically have a value between 3,000 ohms and 10,000 ohms. Capacitor 482 may be adjustable between 0.001 microfarads and 0.5 microfarads to correct for various individual heads associated with the circuit of FIG. 10. In other words capacitor 482 may be adjusted to take account of manufacturing tolerances and the like in the manufacture of individual heads as generally illustrated, for example, in FIG. 1, FIG. 6 or FIG. 10 and associated with the circuit of FIG. 10.

With respect to the circuit of FIG. 10 where clamping is to occur at the back porch of the composite video signal, it is desirable to increase the intensity and/or width of the pulses supplied to the clamping circuit 502 from the winding 510 during the vertical sync. intervals, thereby keeping the sync. level of the clamped composite picture signal more nearly constant.

Referring to the circuit of FIG. 11, the movable plate of capacitor 560 is preferably grounded. Capacitor 560 and inductor 561 are tuned to the frequency of the high frequency bias oscillator component 568 to keep the high frequency bias signal out of the circuits of the television set 554. By way of example, capacitor 560 and inductor 561 may be resonant at 2.75 megacycles per second where this is the frequency of oscillator component 568.

A resistor 960 which may, for example, have a value of 500,000 ohms is preferably connected between the record terminal of selector switch 668 and ground.

In the circuit of FIG. 11, resistor 600 may be omitted, depending on the compensation characteristic required.

The resistor 653 in FIG. 11 is used mainly for adjusting the low frequency phase shift (although it does affect the gain of the video circuit).

In one embodiment in accordance with FIG. 11, capacitor 605 had a value of 0.003 microfarads while resistor 602 had a value of 270 ohms, giving a time constant of 0.81 microseconds. This represented the minimum time constant for the various compensating circuits of the specific embodiment. Capacitor 605 may, however, have a value as low as from about 0.001 to 0.002 microfarads.

Various components of the conventional circuit identified as the 14L30 Chassis have been indicated in FIG. 11 including a resistor 962 and capacitor 963 in the cathode circuit of tubes 660, and resistance elements 965, 966 and 967 leading to a source of B+ voltage (supplying a voltage value of 250 volts D.C. Resistor 967 and the B+ source connected therewith are bypassed by a 4 microfarad capacitor (not shown).

Referring to FIG. 12, a capacitor 970, a resistor 972 and a diode 973 are indicated as being connected to the input line 700 of the circuit. This circuit when interposed between the minus 50 volt sync. pulses and the horizontal control circuit attenuates the vertical pulses which otherwise tend to affect the modified control circuit of FIG. 12 during the vertical blanking interval. The original circuit of Chassis 14L30 responds too slowly for the vertical pulses to change its frequency appreciably.

In FIG. 12, components 737, 726 and 727 serve to supply negative bias voltage to the grid of tube section 703, this negative bias being tapped from the negataive grid voltage of the oscilltor section 733. It will be understood by those skilled in the art that the tube section 703 serves as a reactance tube for controlling the oscillator frequency of the oscillator tube section 733. Section 733 is a Hartley type sine wave oscillator, with coil 741 tapped at 745 and a capacitor 740 forming the frequency determining circuit tuned to approximately 15,750 cycles per second. A movable permeable core in the coil 741 enables trimming of the frequency, this core being moved by the "horizontal hold" knob of the television set. The upper part of coil 741 is coupled to the grid of tube section 733 through capacitor 735, with a grid leak resistor 743, for example of 100,000 ohms, developing the negative bias. Resistor 737 may have a value of 110 megohms, for example. The lower part of the coil 741 which is grounded forms part of the anode or screen portion of the oscillator circuit, with the cathode connected to 745 being at an intermediate potential.

The winding 753*a* gives 300 volt positive pulses, but these pulses are integrated by capacitor 719 in conjunction with resistor 757 so that the wave shape at circuit point 754 is a sawtooth. The small capacitor 756 sharpens the sawtooth peak to give more sensitivity.

With respect to the relationship R1/R2 should preferably equal C2/C1 as previously mentioned with respect to FIG. 12, it should be understood that the presence of resistance 726 and capacitor 727 will modify this relationship to some extent.

Where the values of capacitors 718 and 719 have been reduced compared to their values in the 14L 30 Chassis, the decreased values have been found to have a negligible effect on the normal operation of the television receiver when the switch 701 is in the upper record or inactive position.

Although it is most economical to use a modified circuit such as that indicated in FIG. 12 in the television set as indicated, a separate horizontal stabilizing circuit along the lines of that shown in FIG. 12 may be utilized instead. As previously indicated resistor 743 is a grid leak resistor and does not have much coupling effect between coil 741 and the grid of tube section 733.

The electric circuitry utilized during recording and a playback corresponded to that illustrated in FIGS. 11 and 12 except that the clamping circuit of FIG. 10 was utilized in place of the clamping circuit of FIG. 11. More specifically, the component of FIG. 11 between points 980, 981 and 982 were omitted, and the clamping circuit arrangement beyond point 984 in FIG. 10 substituted therefore. The components 944, 515, 516 of FIG. 10 as well as the components 510 and 511 from FIG. 10 were also utilized. The automatic gain control line 935 was not, however, utilized in the demonstration apparatus. The recording circuit including components 669, 960, 560 and 561 of FIG. 11 were utilized in the demonstration apparatus instead of the corresponding component of FIG. 10.

In the modified embodiment of the amplifier circuit of FIG. 11 which has been adapted for demonstration purposes, the component values are preferably as follows:

| COMPONENT | | COMPONENT VALUE | |
|---|---|---|---|
| Capacitor | 559 | 85 | micro microfarads |
| Capacitor | 560 | 5–80 | micro microfarads |
| Capacitor | 578 | 0.15 | microfarads |
| Capacitor | 584 | 50 | microfarads |
| Capacitor | 587 | .02 | microfarads |
| Capacitor | 593 | .047 | microfarads |
| Capacitor | 596 | 50 | micro microfarads |
| Capacitor | 605 | .003 | microfarads |
| Capacitor | 616 | 100 | microfarads |
| Capacitor | 611 | 50 | microfarads |
| Capacitor | 627 | .05 | microfarads |
| Capacitor | 631 | .01 | microfarads |
| Capacitor | 613 | 10 | microfarads |
| Capacitor | 639 | 100 | microfarads |
| Capacitor | 625 | 8 | microfarads |
| Capacitor | 644 | .1 | microfarads |
| Capacitor | 669 | 4 | microfarads |
| Resistor | 562 | 24 | K ohms |
| Resistor | 581 | 10 | K ohms |
| Resistor | 582 | 10 | K ohms |
| Resistor | 580 | 150 | K ohms |
| Resistor | 583 | 1 | K ohm |
| Resistor | 586 | 18 | K ohms |
| Resistor | 589 | 3.3 | K ohms |
| Resistor | 595 | 12 | K ohms |
| Resistor | 602 | 270 | ohms |
| do. | 604 | 47 | K ohms |
| do. | 615 | 68 | ohms |
| do. | 607 | 47 | K ohms |
| do. | 608 | 65 | K ohms |

-Continued

| COMPONENT | | COMPONENT VALUE | |
|---|---|---|---|
| do. | 609 | 22 | K ohms |
| do. | 628 | 4.7 | K ohms |
| do. | 636 | 150 | K ohms |
| do. | 638 | 60 | ohms |
| do. | 626 | 7.5 | K ohms |
| do. | 622 | 1 | K ohm |
| do. | 646 | 3 | K ohms |
| do. | 643 | 4.7 | K ohms |
| do. | 558 | 22 | K ohms |
| Inductor | 590 | 250 | microhenries |
| do. | 601 | 250 | microhenries |
| do. | 629 | 250 | microhenries |
| do. | 632 | 500 | microhenries |
| do. | 647 | 100 | microhenries |
| do. | 561 | 100 | microhenries |
| Transistor | 577 | 2N708 | |
| Tube | 592 | Pentode 6GM6 or 6CB6A | |
| Tube | 635 | Pentode 6GM6 or 6CB6A | |

(Parts from FIG. 10 substituted in place of Parts 650, 654, 661, 653, 657, 656, 655, 665 in FIG. 11)

| COMPONENT | | COMPONENT VALUE | |
|---|---|---|---|
| Capacitor | 506 | .047 | microfarads |
| Capacitor | 498 | .003 | microfarads |
| Capacitor | 656 | .01 | microfarads |
| Resistor | 508 | 22,000 | ohms |
| Resistor | 505 | 470,000 | ohms |
| Resistor | 515 | 4,700 | ohms |
| Resistor | 667 | 68,000 | ohms |
| Resistor | 664 | 330 | ohms |
| Inductor | L1 | 6.2 | millihenries |
| Inductor | 516 | 250 | microhenries |
| Diode | 503 | IN34A | |
| Diode | 507 | IN34A | |
| Inductor | L2 | omitted | |

It will be noted that in the actual demonstration circuit, resistor 600 of FIG. 11 is omitted.

The playback frequency response for the demonstration apparatus including the head (but not the tape) was flat from about 16 kilocycles per second to the resonant peak frequency of the head, the response thereafter rising at an increasing rate to the upper useful frequency limit of the system. Thus, the playback frequency response was flat from about 16 kilocycles per second to approximately 300 kilocycles per second, the response thereafter rising at an increasing rate to approximately 2 megacycles per second. The head had irregularities (peaks and valleys) in its response curve due to pickup at points other than the main gap (such as edges of the head core) and the dimensions of the head core were such that these irregularities occurred at frequencies below 15,750 cycles per second. In the demonstration apparatus, the clamp circuit of FIG. 10 operated with a signal polarity such that the sync. pulses were negative. Of course the clamp circuit can be reversed for an opposite polarity signal.

To illustrate the flutter reduction obtained in the demonstration apparatus using the circuit of FIG. 12, the following tabulation may be given indicating generally the results observed.

| Flutter Frequency, Cycles Per Second | Ratio of Reproduced Flutter with Circuit of FIG. 12/Flutter with Original Circuit in same TV Set |
|---|---|
| 10 | 0.14 |
| 20 | 0.13 |
| 30 | 0.06 |
| 60 | 0.05 |
| 120 | 0.07 |
| 180 | 0.12 |
| 300 | 0.15 |

-Continued

| Flutter Frequency, Cycles Per Second | Ratio of Reproduced Flutter with Circuit of FIG. 12/Flutter with Original Circuit in same TV Set |
|---|---|
| 600 | 0.23 |
| 900 | 0.50 |
| 1200 | 0.75 |
| 3000 | 0.80 |
| 10,000 | 0.80 |

The playback circuit of the demonstration apparatus including the head provides a substantial useful low frequency response down to at least about 800 cycles per second. The response below this relatively low frequency drops off at an increasing rate which reaches a rate higher than 6 decibels per octave. There is a substantial boost in low frequency response in the region between about 800 cycles per second and about 8,000 cycles per second. Thus there is a substantial boost in low frequency response at frequencies directly above the low frequency cutoff value of about 800 cycles per second.

It will be observed that the time constant for capacitor 721 and resistor 728 in FIG. 12 is about 30 microseconds. The time constant for capacitor 705 and resistor 706 is about 75 microseconds. The time constant for capacitor 719 and resistor 714 is about 130 microseconds, and the time constant for capacitor 718 and resistor 713 is about 130 microseconds also. Capacitor 729 and resistor 728 have a time constant of about 75 microseconds, matching 705 and 706.

In the demonstration apparatus it is considered that the time constant provided by capacitor 721 and resistor 728 is of greatest importance.

It has been found that interference between the high frequency bias and the television picture signal during recording is reduced if the bias oscillator frequency is adjusted to certain exact values where beats are minimized. (For this reason capacitor 423 in FIG. 10 is preferably a variable capacitor.)

In general the time constants of the correction networks in the various embodiments are considered of substantial importance and the illustrated values given herein represent good choices for such time constants.

Compensation is preferably provided in the earliest stage as in FIGS. 10 and 11 to prevent distortion of high level signals by the amplifier. Although the equalizing circuits in FIGS. 10 and 11 resemble video amplifier coupling networks in some respects, the values of resistance, capacitance and inductance chosen for the illustrated circuits as given herein are widely different from conventional video amplifier circuits, and give sharp changes in frequency response over the useful spectrum; in contrast to a relatively flat response which is the objective of ordinary video compensating networks.

The time constants chosen in FIG. 10, 11 and 12, for example, are unique and important for television recording and the like.

It is contemplated that the demonstration apparatus may be successively operated at a lower speed such as 60 inches per second, for example.

In the circuit of FIG. 10 diode 507 may be shorted out.

Compensation for flutter may be effected by using the output of a discriminator or frequency comparison circuit as in FIG. 13 or FIG. 12 to control the width of the horizontal scan in the display tube, as by narrowing the width when the playback is too slow, and increasing the width when the signal is too fast. The width may be controlled by modulating the screen voltage of the horizontal output tube, or by modulating the high voltage applied to the display tube, according to the output from the frequency comparison circuit.

In FIG. 11 the circuit point *b* common to 650 and 661 assumes a positive potential with respect to ground, depending on the potential of 614 and the relative values of 657 and 653. Capacitor 654 also assumes practically the same potential. The composite video and negative going sync. applied to this circuit point *b* through 650 may swing the circuit point *b* in the positive direction with minimum loading since this places a reverse voltage across diode 656. However when the signal swings in the negative direction, diode 656 becomes conducting and offers a low impedance to ground through 654. The signal is thus clamped at its negative sync. level.

Rectification of the negative sync. tips lowers the potential of 654 (and of *b*) momentarily, but 654 regains its charge through 657 during the interval between sync. pulses. The discharge rate of point *b* through 653 is nearly independent of the signal because it is determined mainly by the bias which is added to the signal. The bias may be five to 10 times as great as the signal, or even higher. This arrangement gives a clamping action independent of variations in the picture, especially in portions of the cycle where the signal is becoming more positive; and provides uniform shading of the picture. The degree of discharge may be regulated by adjustment of 653. Inductor 655 minimizes clipping the leading edge of the sync. pulses. Coupling network 661, 665 transfers the clamped signal to the TV set without substantial distortion.

The recording circuits are essentially flat to below 10 cycles per second in voltage response, with negligible phase shift to below 60 cycles per second. At low and medium frequencies the picture voltage waveform including normal sync. pulses is transformed faithfully into a current waveform by 558, 421, or 163; into a magnetic flux waveform by head 550, 400 or 100; and recorded as a variation in flux on tape 11.

At the highest frequencies, capacitors 559, 420, 158, and 162 compensate for shunt capacity of the head, impedance rise in its windings, core losses, losses in the recording circuits, etc. to maintain the recording flux wave as a faithful reproduction of the composite signal.

A preferred condition of recording head response is when the voltage across the head winding rises in direct proportion to frequency at frequencies high enough so that head winding resistance is negligible compared with its reactance. When this condition is achieved the current in the heads described in this specification rises with frequency to a certain degree.

The 6GM6 tube is suitable for A.G.C. operation, as its amplification varies with grid bias.

The demonstration apparatus used a hysteresis synchronous type capstan motor.

As an alternative to driving the head from the output of the TV set video amplifier, the amplifier in the recorder could be used for this purpose. For example, during recording the grid of 635 can be connected to the TV set at its video detector or to the cathode circuit of its video amplifier, or to its plate circuit through a step down voltage divider. Line 553 would then be connected to the plate circuit of 635 during recording, instead of to the plate circuit of the TV set video amplifier. This arrangement reduces loading of the TV video amplifier, eliminates some connections, and reduces the impedance level of the signals in the cable.

In place of the vacuum tubes, transistors could be used without altering the function of the associated circuits.

In regards to reducing the reflected capacitance across the head to the lowest possible value, it may be desirable to omit 458 and/or 466 and obtain an equivalent effect elsewhere in the circuit.

If no additional grid bias is desired from the clamping circuit, 505 may be reduced to zero, and 506 eliminated.

A.G.C. line 935 may similarly be connected to 468, or to both 468 and 488.

The following are objects of the invention:

1. Circuit and head combination that gives high output and signal-noise ratio even with a very narrow track width, allowing more tracks on a given width of tape.
2. Simple circuits that give adequate correction for video (and radar) recording, using direct recording.
3. Faithful reproduction of recorded waveforms over a video frequency spectrum.
4. Economy of tape usage as well as of mechanism and of circuitry to give a practical home recorder for video.
5. Stabilization of picture signal that enables the use of an inexpensive drive.
6. Stabilization that tolerates considerable flutter during recording and/or playback.
7. Treatment of signal that compensates for defects in the magnetic recording and/or playback process of a video signal including hum pickup, inherent tape noise, amplifier noise, deficiencies of heads and tapes, rate of change playback effects, phase shifts, etc.
8. Reproduction of a steady picture from a video signal which has a relatively high degree of frequency or amplitude modulation due to drive instability.

The time constants of the RC and L networks in the amplifier circuits of FIGS. 10 and 11 and in the stabilizing circuits of FIG. 12 and 13 are important in producing the desired results in recording and reproduction of the picture. These may be calculated readily from the tabulated values, and important limits of these are indicated in some of the appended claims.

It will be apparent that may modifications and variations may be effected without departing from the scope of the novel concepts of this invention.

General Discussion of the Invention

In each exemplary embodiment, a series resistance such as 508, FIG. 10 of substantial value is provided in the branch of the clamping circuit which supplies clamping pulses to an output circuit point such as 948, FIG. 10, the series resistance serving to control the degree of clamping action. Thus too strong a clamping action, which it is found may adversely affect picture quality in a flutter-tolerant reproducing system, is avoided. Accordingly, the clamping circuit is noncritical as to shift in clampling interval due to flutter in the signal reproduced from the record medium. (See the present specification, application page 77, line 16 through application page 78, line 24 and application page 81, lines 5–8.)

A shunt resistor 944, FIG. 10, is connected with output circuit point 948, and provides a discharge path for coupling capacitor 498. The coupling capacitor 498 and shunt resistor 944 have a time constant in the range from about 200 microseconds to about 2,000 microseconds so as to control the average slope of the picture signal voltage as a function of time, between successive clamping periods. (See the present specification, application page 80, line 25 to application page 81, line 4.)

I claim as my invention:

1. In a transducer system including a broadcast television receiver having a horizontal deflection circuit for generating an output horizontal sweep frequency signal, a horizontal control circuit for controlling the frequency of said horizontal deflection circuit, a picture signal circuit for transmitting a video picture signal, and a video display unit having a horizontal sweep connected with said horizontal deflection circuit and having a video intensity control connected with said video signal circuit for display of a picture transmitted thereto, a record medium having a recorded signal comprising video picture signals occurring during successive line scan intervals and periodic horizontal synchronizing signals occurring at the beginning of the respective line scan intervals, a playback system for scanning said record medium and electrically reproducing said recorded signal with a degree of flutter substantially exceeding that of a broadcast television signal as received by said receiver, circuit means connected with said playback system, and with said horizontal control circuit and with said picture signal circuit, for transmitting the reproduced horizontal synchronizing signals to said horizontal control circuit such that the horizontal sweep of the display unit responds to and follows the flutter in the reproduced horizontal synchronizing signals, and for transmitting the reproduced video picture signal to the intensity control of the display unit, wherein the improvement comprises said circuit means including an output circuit point and a coupling capacitor for coupling the output of the playback system with the picture signal circuit via said output circuit point and a shunt clamping circuit connected with said output circuit point for controlling the direct current potential at said output circuit point at the beginning of each line scan interval, the clamping circuit including a first branch connected between said horizontal deflection circuit and said output circuit point for supplying a clamping pulse of predetermined duration from said horizontal deflection circuit to said output circuit point at the beginning of each line scan interval, and a second branch connected with said output circuit point and comprising a diode and potential establishing means in series for establishing a reference potential at said output circuit point in response to each of said clamping pulses, and said first branch having series resistance therein of substantial value to control the degree of clamping action.

2. In a transducer system according to claim 1, shunt resistance means connected with said output circuit point in parallel with said second branch for providing a discharge path for said coupling capacitor, said coupling capacitor and said shunt resistance means having a time constant in the range from about 200 microseconds to about 2,000 microseconds.

3. In a transducer system according to claim 1, said series resistance having a time constant with the coupling capacitor of the order of 20 microseconds.

* * * * *